United States Patent
Reed et al.

(10) Patent No.: US 9,122,832 B2
(45) Date of Patent: Sep. 1, 2015

(54) METHODS FOR CONTROLLING MICROLOADING VARIATION IN SEMICONDUCTOR WAFER LAYOUT AND FABRICATION

(75) Inventors: Brian Reed, San Jose, CA (US); Michael C. Smayling, Fremont, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 595 days.

(21) Appl. No.: 12/512,932

(22) Filed: Jul. 30, 2009

(65) Prior Publication Data

US 2010/0031211 A1 Feb. 4, 2010

Related U.S. Application Data

(60) Provisional application No. 61/085,800, filed on Aug. 1, 2008.

(51) Int. Cl.
*G06F 17/50* (2006.01)

(52) U.S. Cl.
CPC ........ *G06F 17/5081* (2013.01); *G06F 2217/12* (2013.01)

(58) Field of Classification Search
CPC .................. G06F 17/5081; G06F 2217/12
USPC ...................... 716/50–56; 430/5, 30
See application file for complete search history.

(56) References Cited

U.S. PATENT DOCUMENTS

| | | |
|---|---|---|
| 4,197,555 A | 4/1980 | Uehara et al. |
| 4,417,161 A | 11/1983 | Uya |
| 4,424,460 A | 1/1984 | Best |
| 4,613,940 A | 9/1986 | Shenton et al. |
| 4,657,628 A | 4/1987 | Holloway et al. |
| 4,682,202 A | 7/1987 | Tanizawa |

(Continued)

FOREIGN PATENT DOCUMENTS

| | | |
|---|---|---|
| EP | 0102644 | 7/1989 |
| EP | 0788166 | 8/1997 |

(Continued)

OTHER PUBLICATIONS

U.S. Appl. No. 60/625,342, filed Aug. 25, 2006, Pileggi et al.
Acar, et al., "A Linear-Centric Simulation Framework for Parametric Fluctuations", 2002, IEEE, Carnegie Mellon University USA, pp. 1-8.
Amazawa, et al., "Fully Planarized Four-Level Interconnection with Stacked VLAS Using CMP of Selective CVD-Al and Insulator and its Application to Quarter Micron Gate Array LSIs", 1995, IEEE, Japan, pp. 473-476.

(Continued)

*Primary Examiner* — Nha Nguyen
(74) *Attorney, Agent, or Firm* — Martine Penilla Group, LLP

(57) ABSTRACT

Problematic open areas are identified in a semiconductor wafer layout. The problematic open areas have a size variation relative to one or more neighboring open areas of the layout sufficient to cause adverse microloading variation. In one embodiment, the adverse microloading variation is controlled by shifting a number of layout features to interdict the problematic open areas. In another embodiment, the adverse microloading variation is controlled by defining and placing a number of dummy layout features to shield actual layout features that neighbor the problematic open areas. In another embodiment, the adverse microloading variation is controlled by utilizing sacrificial layout features which are actually fabricated on the wafer temporarily to eliminate microloading variation, and which are subsequently removed from the wafer to leave behind the desired permanent structures.

20 Claims, 23 Drawing Sheets

(56) References Cited

U.S. PATENT DOCUMENTS

| | | |
|---|---|---|
| 4,745,084 A | 5/1988 | Rowson et al. |
| 4,780,753 A | 10/1988 | Ohkura et al. |
| 4,801,986 A | 1/1989 | Chang et al. |
| 4,804,636 A | 2/1989 | Groover, III |
| 4,812,688 A | 3/1989 | Chu et al. |
| 4,884,115 A | 11/1989 | Michel et al. |
| 4,928,160 A | 5/1990 | Crafts |
| 4,975,756 A | 12/1990 | Haken et al. |
| 5,068,603 A | 11/1991 | Mahoney |
| 5,079,614 A | 1/1992 | Khatakhotan |
| 5,097,422 A | 3/1992 | Corbin et al. |
| 5,117,277 A | 5/1992 | Yuyama et al. |
| 5,121,186 A | 6/1992 | Wong et al. |
| 5,208,765 A | 5/1993 | Turnbull |
| 5,224,057 A | 6/1993 | Igarashi |
| 5,242,770 A | 9/1993 | Chen et al. |
| 5,268,319 A | 12/1993 | Harari |
| 5,298,774 A | 3/1994 | Ueda et al. |
| 5,313,426 A | 5/1994 | Sakuma et al. |
| 5,351,197 A | 9/1994 | Upton et al. |
| 5,359,226 A | 10/1994 | DeJong |
| 5,365,454 A | 11/1994 | Nakagawa et al. |
| 5,367,187 A | 11/1994 | Yuen |
| 5,378,649 A | 1/1995 | Huang |
| 5,396,128 A | 3/1995 | Dunning et al. |
| 5,420,447 A | 5/1995 | Waggoner |
| 5,461,577 A | 10/1995 | Shaw et al. |
| 5,471,403 A | 11/1995 | Fujimaga |
| 5,497,334 A | 3/1996 | Russell et al. |
| 5,497,337 A | 3/1996 | Ponnapalli et al. |
| 5,526,307 A | 6/1996 | Lin et al. |
| 5,536,955 A | 7/1996 | Ali |
| 5,545,904 A | 8/1996 | Orbach |
| 5,581,098 A | 12/1996 | Chang |
| 5,581,202 A | 12/1996 | Yano et al. |
| 5,612,893 A | 3/1997 | Hao et al. |
| 5,636,002 A | 6/1997 | Garofalo |
| 5,656,861 A | 8/1997 | Godinho et al. |
| 5,682,323 A | 10/1997 | Pasch et al. |
| 5,684,311 A | 11/1997 | Shaw |
| 5,684,733 A | 11/1997 | Wu et al. |
| 5,698,873 A | 12/1997 | Colwell et al. |
| 5,705,301 A | 1/1998 | Garza et al. |
| 5,723,883 A | 3/1998 | Gheewalla |
| 5,723,908 A | 3/1998 | Fuchida et al. |
| 5,740,068 A | 4/1998 | Liebmann et al. |
| 5,745,374 A | 4/1998 | Matsumoto |
| 5,764,533 A | 6/1998 | deDood |
| 5,774,367 A | 6/1998 | Reyes et al. |
| 5,780,909 A | 7/1998 | Hayashi |
| 5,789,776 A | 8/1998 | Lancaster et al. |
| 5,790,417 A | 8/1998 | Chao et al. |
| 5,796,128 A | 8/1998 | Tran et al. |
| 5,796,624 A | 8/1998 | Sridhar et al. |
| 5,798,298 A * | 8/1998 | Yang et al. .................... 438/622 |
| 5,814,844 A | 9/1998 | Nagata et al. |
| 5,825,203 A | 10/1998 | Kusunoki et al. |
| 5,834,851 A | 11/1998 | Ikeda et al. |
| 5,838,594 A | 11/1998 | Kojima |
| 5,841,663 A | 11/1998 | Sharma et al. |
| 5,847,421 A | 12/1998 | Yamaguchi |
| 5,850,362 A | 12/1998 | Sakuma et al. |
| 5,852,562 A | 12/1998 | Shinomiya et al. |
| 5,858,580 A | 1/1999 | Wang et al. |
| 5,898,194 A | 4/1999 | Gheewala |
| 5,900,340 A | 5/1999 | Reich et al. |
| 5,908,827 A | 6/1999 | Sirna |
| 5,915,199 A | 6/1999 | Hsu |
| 5,917,207 A | 6/1999 | Colwell et al. |
| 5,920,486 A | 7/1999 | Beahm et al. |
| 5,923,059 A | 7/1999 | Gheewala |
| 5,923,060 A | 7/1999 | Gheewala |
| 5,929,469 A | 7/1999 | Mimoto et al. |
| 5,930,163 A | 7/1999 | Hara et al. |
| 5,935,763 A | 8/1999 | Caterer et al. |
| 5,949,101 A | 9/1999 | Aritome |
| 5,973,507 A | 10/1999 | Yamazaki |
| 5,977,305 A | 11/1999 | Wigler et al. |
| 5,977,574 A | 11/1999 | Schmitt et al. |
| 5,998,879 A | 12/1999 | Iwaki et al. |
| 6,009,251 A | 12/1999 | Ho et al. |
| 6,026,223 A | 2/2000 | Scepanovic et al. |
| 6,037,613 A | 3/2000 | Mariyama |
| 6,037,617 A | 3/2000 | Kumagai |
| 6,044,007 A | 3/2000 | Capodieci |
| 6,054,872 A | 4/2000 | Fudanuki et al. |
| 6,063,132 A | 5/2000 | DeCamp et al. |
| 6,077,310 A | 6/2000 | Yamamoto et al. |
| 6,080,206 A | 6/2000 | Tadokoro et al. |
| 6,084,437 A | 7/2000 | Sako |
| 6,091,845 A | 7/2000 | Pierrat et al. |
| 6,099,584 A | 8/2000 | Arnold et al. |
| 6,100,025 A | 8/2000 | Wigler et al. |
| 6,114,071 A | 9/2000 | Chen et al. |
| 6,144,227 A | 11/2000 | Sato |
| 6,159,839 A | 12/2000 | Jeng et al. |
| 6,166,415 A | 12/2000 | Sakemi et al. |
| 6,166,560 A | 12/2000 | Ogura et al. |
| 6,174,742 B1 | 1/2001 | Sudhindranath et al. |
| 6,182,272 B1 | 1/2001 | Andreev et al. |
| 6,194,104 B1 | 2/2001 | Hsu |
| 6,194,252 B1 | 2/2001 | Yamaguchi |
| 6,194,912 B1 | 2/2001 | Or-Bach |
| 6,209,123 B1 | 3/2001 | Maziasz et al. |
| 6,230,299 B1 | 5/2001 | McSherry et al. |
| 6,232,173 B1 | 5/2001 | Hsu et al. |
| 6,240,542 B1 | 5/2001 | Kapur |
| 6,249,902 B1 | 6/2001 | Igusa et al. |
| 6,255,600 B1 | 7/2001 | Schaper |
| 6,255,845 B1 | 7/2001 | Wong et al. |
| 6,262,487 B1 | 7/2001 | Igarashi et al. |
| 6,269,472 B1 | 7/2001 | Garza et al. |
| 6,275,973 B1 | 8/2001 | Wein |
| 6,282,696 B1 | 8/2001 | Garza et al. |
| 6,291,276 B1 | 9/2001 | Gonzalez |
| 6,297,668 B1 | 10/2001 | Schober |
| 6,297,674 B1 | 10/2001 | Kono et al. |
| 6,303,252 B1 | 10/2001 | Lin |
| 6,331,733 B1 | 12/2001 | Or-Bach et al. |
| 6,331,791 B1 | 12/2001 | Huang |
| 6,335,250 B1 | 1/2002 | Egi |
| 6,338,972 B1 | 1/2002 | Sudhindranath et al. |
| 6,347,062 B2 | 2/2002 | Nii et al. |
| 6,356,112 B1 | 3/2002 | Tran et al. |
| 6,359,804 B2 | 3/2002 | Kuriyama et al. |
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,049 B1 | 9/2002 | Iranmanesh |
| 6,445,065 B1 | 9/2002 | Gheewala et al. |
| 6,467,072 B1 | 10/2002 | Yang et al. |
| 6,469,328 B2 | 10/2002 | Yanai et al. |
| 6,470,489 B1 | 10/2002 | Chang et al. |
| 6,476,493 B2 | 11/2002 | Or-Bach et al. |
| 6,477,695 B1 | 11/2002 | Gandhi |
| 6,480,032 B1 | 11/2002 | Aksamit |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,504,186 B2 | 1/2003 | Kanamoto et al. |
| 6,505,327 B2 | 1/2003 | Lin |
| 6,505,328 B1 | 1/2003 | van Ginneken et al. |

(56) References Cited

U.S. PATENT DOCUMENTS

| | | |
|---|---|---|
| 6,507,941 B1 | 1/2003 | Leung et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,566,720 B2 | 5/2003 | Aldrich |
| 6,570,234 B1 | 5/2003 | Gardner |
| 6,571,140 B1 | 5/2003 | Wewalaarachchi |
| 6,571,379 B2 | 5/2003 | Takayama |
| 6,574,786 B1 | 6/2003 | Pohlenz et al. |
| 6,578,190 B2 | 6/2003 | Ferguson et al. |
| 6,583,041 B1 | 6/2003 | Capodieci |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,621,132 B2 | 9/2003 | Onishi et al. |
| 6,632,741 B1 | 10/2003 | Clevenger et al. |
| 6,633,182 B2 | 10/2003 | Pileggi et al. |
| 6,635,935 B2 | 10/2003 | Makino |
| 6,642,744 B2 | 11/2003 | Or-Bach et al. |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,664,587 B2 | 12/2003 | Guterman et al. |
| 6,673,638 B1 | 1/2004 | Bendik et al. |
| 6,677,649 B2 | 1/2004 | Minami et al. |
| 6,687,895 B2 | 2/2004 | Zhang |
| 6,690,206 B2 | 2/2004 | Rikino et al. |
| 6,691,297 B1 | 2/2004 | Misaka et al. |
| 6,700,405 B1 | 3/2004 | Hirairi |
| 6,703,170 B1 * | 3/2004 | Pindo .............................. 430/5 |
| 6,709,880 B2 | 3/2004 | Yamamoto et al. |
| 6,714,903 B1 | 3/2004 | Chu et al. |
| 6,732,334 B2 | 5/2004 | Nakatsuka |
| 6,732,338 B2 | 5/2004 | Crouse et al. |
| 6,732,344 B2 | 5/2004 | Sakamoto et al. |
| 6,734,506 B2 | 5/2004 | Oyamatsu |
| 6,737,199 B1 | 5/2004 | Hsieh |
| 6,737,318 B2 | 5/2004 | Murata et al. |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,750,555 B2 | 6/2004 | Satomi et al. |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B1 | 8/2004 | Samuels |
| 6,787,823 B2 | 9/2004 | Shibutani |
| 6,789,244 B1 | 9/2004 | Dasasathyan et al. |
| 6,789,246 B1 | 9/2004 | Mohan et al. |
| 6,792,591 B2 | 9/2004 | Shi et al. |
| 6,792,593 B2 | 9/2004 | Takashima et al. |
| 6,794,677 B2 | 9/2004 | Tamaki et al. |
| 6,794,914 B2 | 9/2004 | Sani et al. |
| 6,795,332 B2 | 9/2004 | Yamaoka et al. |
| 6,795,358 B2 | 9/2004 | Tanaka et al. |
| 6,795,952 B1 | 9/2004 | Stine et al. |
| 6,795,953 B2 | 9/2004 | Bakarian et al. |
| 6,800,883 B2 | 10/2004 | Furuya et al. |
| 6,807,663 B2 | 10/2004 | Cote et al. |
| 6,809,399 B2 | 10/2004 | Ikeda et al. |
| 6,812,574 B2 | 11/2004 | Tomita et al. |
| 6,818,389 B2 | 11/2004 | Fritze et al. |
| 6,818,929 B2 | 11/2004 | Tsutsumi et al. |
| 6,819,136 B2 | 11/2004 | Or-Bach |
| 6,820,248 B1 | 11/2004 | Gan |
| 6,826,738 B2 | 11/2004 | Cadouri |
| 6,834,375 B1 | 12/2004 | Stine et al. |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,867,073 B1 | 3/2005 | Enquist |
| 6,871,338 B2 | 3/2005 | Yamauchi |
| 6,872,990 B1 | 3/2005 | Kang |
| 6,877,144 B1 | 4/2005 | Rittman et al. |
| 6,881,523 B2 | 4/2005 | Smith |
| 6,884,712 B2 | 4/2005 | Yelehanka et al. |
| 6,885,045 B2 | 4/2005 | Hidaka |
| 6,889,370 B1 | 5/2005 | Kerzman et al. |
| 6,897,517 B2 | 5/2005 | Van Houdt et al. |
| 6,897,536 B2 | 5/2005 | Nomura et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,921,982 B2 | 7/2005 | Joshi et al. |
| 6,922,354 B2 | 7/2005 | Ishikura et al. |
| 6,924,560 B2 | 8/2005 | Wang et al. |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |
| 6,957,402 B2 | 10/2005 | Templeton et al. |
| 6,968,527 B2 | 11/2005 | Pierrat |
| 6,974,978 B1 | 12/2005 | Possley |
| 6,977,856 B2 | 12/2005 | Tanaka et al. |
| 6,978,436 B2 | 12/2005 | Cote et al. |
| 6,978,437 B1 | 12/2005 | Rittman et al. |
| 6,980,211 B2 | 12/2005 | Lin et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 7,003,068 B2 | 2/2006 | Kushner et al. |
| 7,009,862 B2 | 3/2006 | Higeta et al. |
| 7,016,214 B2 | 3/2006 | Kawamata |
| 7,022,559 B2 | 4/2006 | Barnak et al. |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,413 B2 | 7/2006 | Tsukamoto et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,185,294 B2 | 2/2007 | Zhang |
| 7,188,322 B2 | 3/2007 | Cohn et al. |

(56) References Cited

U.S. PATENT DOCUMENTS

| | | |
|---|---|---|
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 * | 6/2007 | Chen et al. ............... 438/107 |
| 7,243,316 B2 | 7/2007 | White et al. |
| 7,252,909 B2 * | 8/2007 | Shin et al. ............... 430/5 |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 * | 12/2008 | Chen ............... 257/774 |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 * | 5/2009 | Zhou et al. ............... 430/5 |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,932,544 B2 | 4/2011 | Becker et al. |
| 7,932,545 B2 | 4/2011 | Becker et al. |
| 7,934,184 B2 | 4/2011 | Zhang |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 * | 6/2011 | Lu et al. ............... 716/55 |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |

(56) References Cited

U.S. PATENT DOCUMENTS

| | | |
|---|---|---|
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 | 7/2012 | Hong et al. |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,316,327 B2 | 11/2012 | Herold |
| 8,356,268 B2 | 1/2013 | Becker et al. |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 | 5/2013 | Becker et al. |
| 8,453,094 B2 | 5/2013 | Kornachuk et al. |
| 8,575,706 B2 | 11/2013 | Becker et al. |
| 8,667,443 B2 | 3/2014 | Smayling et al. |
| 8,701,071 B2 | 4/2014 | Kornachuk et al. |
| 8,735,995 B2 | 5/2014 | Becker et al. |
| 8,756,551 B2 | 6/2014 | Becker et al. |
| 8,836,045 B2 | 9/2014 | Becker et al. |
| 8,839,162 B2 | 9/2014 | Amundson et al. |
| 8,839,175 B2 | 9/2014 | Smayling et al. |
| 8,847,329 B2 | 9/2014 | Becker et al. |
| 8,863,063 B2 | 10/2014 | Becker et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1* | 3/2003 | Liu .................................. 716/19 |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1* | 6/2003 | Moniwa et al. .................. 716/19 |
| 2003/0117168 A1 | 6/2003 | Uneme et al. |
| 2003/0124847 A1 | 7/2003 | Houston et al. |
| 2003/0125917 A1 | 7/2003 | Rich et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0203287 A1 | 10/2003 | Miyagawa |
| 2003/0229868 A1 | 12/2003 | White et al. |
| 2003/0229875 A1 | 12/2003 | Smith et al. |
| 2004/0029372 A1 | 2/2004 | Jang et al. |
| 2004/0049754 A1 | 3/2004 | Liao et al. |
| 2004/0063038 A1* | 4/2004 | Shin et al. ...................... 430/311 |
| 2004/0115539 A1 | 6/2004 | Broeke et al. |
| 2004/0139412 A1* | 7/2004 | Ito et al. ............................ 716/8 |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0169201 A1 | 9/2004 | Hidaka |
| 2004/0194050 A1* | 9/2004 | Hwang et al. .................... 716/19 |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1* | 1/2005 | Hwang et al. .................. 438/689 |
| 2005/0012157 A1 | 1/2005 | Cho et al. |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1 | 12/2005 | Kawachi |
| 2005/0280031 A1 | 12/2005 | Yano |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |

(56) References Cited

U.S. PATENT DOCUMENTS

| | | |
|---|---|---|
| 2006/0181310 A1 | 8/2006 | Rhee |
| 2006/0195809 A1 | 8/2006 | Cohn et al. |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0001304 A1 | 1/2007 | Liaw |
| 2007/0002617 A1 | 1/2007 | Houston |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1* | 5/2007 | Zhou et al. ............ 430/5 |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1 | 8/2007 | Tanaka |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1 | 10/2007 | Uedi et al. |
| 2007/0256039 A1 | 11/2007 | White |
| 2007/0257277 A1 | 11/2007 | Takeda et al. |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1* | 12/2007 | Chen ............ 257/773 |
| 2007/0294652 A1 | 12/2007 | Bowen |
| 2007/0297249 A1 | 12/2007 | Chang et al. |
| 2008/0005712 A1 | 1/2008 | Charlebois et al. |
| 2008/0021689 A1 | 1/2008 | Yamashita et al. |
| 2008/0022247 A1 | 1/2008 | Kojima et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1 | 4/2008 | Kobayashi et al. |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1* | 6/2009 | Yanagidaira et al. ......... 438/584 |
| 2009/0181314 A1* | 7/2009 | Shyu et al. ............ 430/5 |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0252865 A1 | 10/2010 | Van Der Zanden |
| 2010/0264468 A1 | 10/2010 | Xu |
| 2010/0270681 A1 | 10/2010 | Bird et al. |
| 2010/0287518 A1 | 11/2010 | Becker |
| 2011/0016909 A1 | 1/2011 | Mirza et al. |
| 2011/0108890 A1 | 5/2011 | Becker et al. |
| 2011/0108891 A1 | 5/2011 | Becker et al. |

(56) References Cited

U.S. PATENT DOCUMENTS

| | | |
|---|---|---|
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2012/0012932 A1 | 1/2012 | Perng et al. |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |
| 2014/0197543 A1 | 7/2014 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 61-182244 | 8/1986 |
| JP | S63-310136 A | 12/1988 |
| JP | H01284115 | 11/1989 |
| JP | 03-165061 | 7/1991 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2005-114752 | 10/2006 |
| JP | 2006-303022 A | 11/2006 |
| JP | 2007-013060 | 1/2007 |
| JP | 2007-043049 | 2/2007 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 10-2005-0030347 A | 3/2005 |
| KR | 2005-0037965 A | 4/2005 |
| KR | 2006-0108233 A | 10/2006 |
| TW | 386288 | 4/2000 |
| WO | WO 2005/104356 | 11/2005 |
| WO | WO 2006/014849 | 2/2006 |
| WO | WO 2006/052738 | 5/2006 |
| WO | WO 2007/014053 | 2/2007 |
| WO | WO 2007/103587 | 9/2007 |

OTHER PUBLICATIONS

Axelrad et al. "Efficient Full-Chip Yield Analysis Methodology for OPC-Corrected VLSI Design", 2000, International Symposium on Quality Electronic Design (ISQED).

Balasinski et al. "Impact of Subwavelength CD Tolerance on Device Performance", 2002, SPIE.

Burkhardt, et al., "Dark Field Double Dipole Lithography (DDL) for Back-End-Of-Line Processes", 2007, SPIE Proceeding Series, vol. 6520; 65200K.

Capetti, et al., "Sub k1 = 0.25 Lithography with Double Patterning Technique for 45nm Technology Node Flash Memory Devices at λ = 193nm", 2007, SPIE Proceeding Series, vol. 6520; 65202K.

Capodieci, L., et al., "Toward a Methodology for Manufacturability-Driven Design Rule Exploration," DAC 2004, Jun. 7-11, 2004, San Diego, CA.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Patterning with 0.93 NA", 2007, SPIE Proceeding Series, vol. 6520; 65202N.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM.

Cobb et al. "Using OPC to Optimize for Image Slope and Improve Process Window", 2003, SPIE.

Devgan "Leakage Issues in IC Design: Part 3", 2003, CCAD.

DeVor, et al., "Statistical Quality Design and Control", 1992, Macmillan Publishing Company, pp. 264-267.

Dictionary.com, "channel," in Collins English Dictionary—Complete & Unabridged 10th Edition. Source location: HarperCollins Publishers. http://dictionary.reference.com/browse/channel. Available: http://dictionary.reference.com.

Dusa, et al. "Pitch Doubling Through Dual Patterning Lithography Challenges in Integration and Litho Budgets", 2007, SPIE Proceeding Series, vol. 6520; 65200G.

El-Gamal, "Fast, Cheap and Under Control: The Next Implementation Fabric", Jun. 2-6, 2003, ACM Press, pp. 354-355.

Firedberg, et al., "Modeling Within-Field Gate Length Spatial Variation for Process-Design Co-Optimization," 2005 Proc. of SPIE vol. 5756, pp. 178-188.

Frankel, "Quantum State Control Interference Lithography and Trim Double Patterning for 32-16nm Lithography", 2007, SPIE Proceeding Series, vol. 6520; 65202L.

Garg, et al. "Lithography Driven Layout Design", 2005, IEEE.

Grobman et al. "Reticle Enhancement Technology Trends: Resource and Manufacturability Implications for the Implementation of Physical Designs" Apr. 1-4, 2001, ACM.

Grobman et al. "Reticle Enhancement Technology: Implications and Challenges for Physical Design" Jun. 18-22, 2001, ACM.

Gupta et al. "Enhanced Resist and Etch CD Control by Design Perturbation", Oct. 4-7, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED).

Gupta et al. "Detailed Placement for Improved Depth of Focus and CD Control", 2005, ACM.

Gupta et al. "Joining the Design and Mask Flows for Better and Cheaper Masks", Oct. 14-17, 2004, Society of Photo-Optical Instrumentation Engineers.

Gupta et al. "Manufacturing-Aware Physical Design", 2003, ACM.

Gupta et al. "Selective Gate-Length Biasing for Cost-Effective Runtime Leakage Control", Jun. 7-11, 2004, ACM.

Gupta et al. "Wafer Topography-Aware Optical Proximity Correction for Better DOF Margin and CD Control", Apr. 13-15, 2005, SPIE.

(56) References Cited

OTHER PUBLICATIONS

Gupta, Puneet, et al., "Manufacturing-aware Design Methodology for Assist Feature Correctness," 2005.
Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.
Hakko, et al., "Extension of the 2D-TCC Technique to Optimize Mask Pattern Layouts," 2008 Proc. of SPIE vol. 7028, 11 pages.
Halpin et al., "Detailed Placement with Net Length Constraints," Publication Year 2003, Proceedings of the 3rd IEEE International Workshop on System-on-Chip for Real-Time Applications, pp. 22-27.
Hayashida, et al., "Manufacturable Local Interconnect technology Fully Compatible with Titanium Salicide Process", Jun. 11-12, 1991, VMIC Conference.
Heng, et al., "A VLSI Artwork Legalization Technique Base on a New Criterion of Minimum Layout Perturbation", 1997, ACM Press, pp. 116-121.
Heng, et al., "Toward Through-Process Layout Quality Metrics", Mar. 3-4, 2005, Society of Photo-Optical Instrumentation Engineers.
Hu, et al., "Synthesis and Placement Flow for Gain-Based Programmable Regular Fabrics", Apr. 6-9, 2003, ACM Press, pp. 197-203.
Hur et al., "Mongrel: Hybrid Techniques for Standard Cell Placement," Publication Year 2000, IEEE/ACM International Conference on Computer Aided Design, ICCAD-2000, pp. 165-170.
Hutton, et al., "A Methodology for FPGA to Structured-ASIC Synthesis and Verification", 2006, EDAA, pp. 64-69.
INTEL Core Microarchitecture White Paper "Introducing the 45 nm Next-Generation Intel Core Microarchitecture," 2007, Intel Corporation.
Jayakumar, et al., "A Metal and VIA Maskset Programmable VLSI Design Methodology using PLAs", 2004, IEEE, pp. 590-594.
Jhaveri, T. et al., Maximization of Layout Printability/Manufacturability by Extreme Layout Regularity, Proc. of the SPIE, Apr. 2006.
Kang, S.M., Metal-Metal Matrix (M3) for High-Speed MOS VLSI Layout, IEEE Trans. on CAD, vol. CAD-6, No. 5, Sep. 1987.
Kawashima, et al., "Mask Optimization for Arbitrary Patterns with 2D-TCC Resolution Enhancement Technique," 2008 Proc. of SPIE vol. 6924, 12 pages.
Kheterpal, et al., "Design Methodology for IC Manufacturability Based on Regular Logic-Bricks", DAC, Jun. 13-17, 2005, IEEE/AMC, vol. 6520.
Kheterpal, et al., "Routing Architecture Exploration for Regular Fabrics", DAC, Jun. 7-11, 2004, ACM Press, pp. 204-207.
Kim, et al., "Double Exposure Using 193nm Negative Tone Photoresist", 2007, SPIE Proceeding Series, vol. 6520; 65202M.
Kim, et al., "Issues and Challenges of Double Patterning Lithography in DRAM", 2007, SPIE Proceeding Series, vol. 6520; 65200H.
Koorapaty, et al., "Exploring Logic Block Granularity for Regular Fabrics", 2004, IEEE, pp. 1-6.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.
Kuh et al., "Recent Advances in VLSI Layout," Publication Year 1990, Proceedings of the IEEE, vol. 78, Issue 2, pp. 237-263.
Lavin et al. "Backend DAC Flows for "Restrictive Design Rules"", 2004, IEEE.
Li, et al., "A Linear-Centric Modeling Approach to Harmonic Balance Analysis", 2002, IEEE, pp. 1-6.
Li, et al., "Nonlinear Distortion Analysis Via Linear-Centric Models", 2003, IEEE, pp. 897-903.
Liebmann et al., "Integrating DfM Components into a Cohesive Design-to-Silicon Solution," Proc. SPIE 5756, Design and Process Integration for Microelectronic Manufacturing III, 1 (May 13, 2005).
Liebmann et al., "Optimizing Style Options for Sub-Resolution Assist Features," Proc. of SPIE vol. 4346, 2001, pp. 141-152.
Liebmann, et al., "High-Performance Circuit Design for the RET-Enabled 65nm Technology Node", Feb. 26-27, 2004, SPIE Proceeding Series, vol. 5379 pp. 20-29.
Liebmann, L. W., Layout Impact of Resolution Enhancement Techniques: Impediment or Opportunity?, International Symposium on Physical Design, 2003.
Liu et al., "Double Patterning with Multilayer Hard Mask Shrinkage for Sub 0.25 k1 Lithography," Proc. SPIE 6520, Optical Microlithography XX, 65202J (Mar. 27, 2007).
Mansfield et al., "Lithographic Comparison of Assist Feature Design Strategies," Proc. of SPIE vol. 4000, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, 2011.
Mo, et al., "Checkerboard: A Regular Structure and its Synthesis, International Workshop on Logic and Synthesis", 2003, Department of Electrical Engineering and Computer Sciences, UC Berkeley, California, pp. 1-7.
Mo, et al., "PLA-Based Regular Structures and Their Synthesis", 2003, Department of Electrical Engineering and Computer Sciences, IEEE, pp. 723-729.
Mo, et al., "Regular Fabrics in Deep Sub-Micron Integrated-Circuit Design", 2004, Kluwer Academic Publishers, Entire Book.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE.
Op de Beek, et al., "Manufacturability issues with Double Patterning for 50nm half pitch damascene applications, using RELACS® shrink and corresponding OPC", 2007, SPIE Proceeding Series, vol. 6520; 65200I.
Or-Bach, "Programmable Circuit Fabrics", Sep. 18, 2001, e-ASIC, pp. 1-36.
Otten, et al., "Planning for Performance", DAC 1998, ACM Inc., pp. 122-127.
Pack et al. "Physical & Timing Verification of Subwavelength-Scale Designs-Part I: Lithography Impact on MOSFETs", 2003, SPIE.
Pandini, et al., "Congestion-Aware Logic Synthesis", 2002, IEEE, pp. 1-8.
Pandini, et al., "Understanding and Addressing the Impact of Wiring Congestion During Technology Mapping", ISPD Apr. 7-10, 2002, ACM Press, pp. 131-136.
Patel, et al., "An Architectural Exploration of Via Patterned Gate Arrays, ISPD 2003", Apr. 6, 2003, pp. 184-189.
Pham, D., et al., "FINFET Device Junction Formation Challenges," 2006 International Workshop on Junction Technology, pp. 73-77, Aug. 2006.
Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.
Poonawala, et al., "ILT for Double Exposure Lithography with Conventional and Novel Materials", 2007, SPIE Proceeding Series, vol. 6520; 65202Q.
Qian et al. "Advanced Physical Models for Mask Data Verification and Impacts on Physical Layout Synthesis" 2003. IEEE.
Ran, et al., "An Integrated Design Flow for a Via-Configurable Gate Array", 2004, IEEE, pp. 582-589.
Ran, et al., "Designing a Via-Configurable Regular Fabric", Custom Integrated Circuits Conference (CICC). Proceedings of the IEEE, Oct. 2004, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.

(56) References Cited

OTHER PUBLICATIONS

Ran, et al., "The Magic of a Via-Configurable Regular Fabric", Proceedings of the IEEE International Conference on Computer Design (ICCD) Oct. 2004.
Ran, et al., "Via-Configurable Routing Architectures and Fast Design Mappability Estimation for Regular Fabrics", 2005, IEEE, pp. 25-32.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J.
Rosenbluth, et al., "Optimum Mask and Source Patterns to Print a Given Shape," 2001 Proc. of SPIE vol. 4346, pp. 486-502.
Rovner, "Design for Manufacturability in Via Programmable Gate Arrays", May 2003, Graduate School of Carnegie Mellon University.
Sengupta, "An Integrated CAD Framework Linking VLSI Layout Editors and Process Simulators", 1998, Thesis for Rice University, pp. 1-101.
Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Shi et al., "Understanding the Forbidden Pitch and Assist Feature Placement," Proc. of SPIE vol. 4562, 2002, pp. 968-979.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Socha, et al., "Simultaneous Source Mask Optimization (SMO)," 2005 Proc. of SPIE vol. 5853, pp. 180-193.
Sreedhar et al. "Statistical Yield Modeling for Sub-Wavelength Lithography", 2008, IEEE.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Tian et al. "Model-Based Dummy Feature Placement for Oxide Chemical_Mechanical Polishing Manufacturability" 2000, ACM.
Tong, et al., "Regular Logic Fabrics for a Via Patterned Gate Array (VPGA), Custom Integrated Circuits Conference", Sep. 2003, Proceedings of the IEEE, pp. 53-56.
Vanleenhove, et al., "A Litho-Only Approach to Double Patterning", 2007, SPIE Proceeding Series, vol. 6520; 65202F.
Wang, et al., "Performance Optimization for Gridded-Layout Standard Cells", 2004, vol. 5567 SPIE.
Wang, J. et al., Standard Cell Layout with Regular Contact Placement, IEEE Trans. on Semicon. Mfg., vol. 17, No. 3, Aug. 2004.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", 2006, vol. 6156 SPIE.
Wenren, et al., "The Improvement of Photolithographic Fidelity of Two-dimensional Structures Though Double Exposure Method", 2007, SPIE Proceeding Series, vol. 6520; 65202I.
Wilcox, et al., "Design for Manufacturability: A Key to Semiconductor Manufacturing Excellence", 1998, IEEE, pp. 308-313.
Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.
Wu, et al., "A Study of Process Window Capabilities for Two-dimensional Structures under Double Exposure Condition", 2007, SPIE Proceeding Series, vol. 6520; 65202O.
Xiong, et al., "The Constrained Via Minimization Problem for PCB and VLSI Design", 1988, ACM Press/IEEE, pp. 573-578.
Yamamaoto, et al., "New Double Exposure Technique without Alternating Phase Shift Mask", 2007, SPIE Proceeding Series, vol. 6520; 652052P.
Yamazoe, et al., "Resolution Enhancement by Aerial Image Approximation with 2D-TCC," 2007 Proc. of SPIE vol. 6730, 12 pages.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Jul.-Sep. 2007, vol. 6(3), 16 pages.
Zheng, et al."Modeling and Analysis of Regular Symmetrically Structured Power/Ground Distribution Networks", DAC, Jun. 10-14, 2002, ACM Press, pp. 395-398.
Zhu, et al., "A Stochastic Integral Equation Method for Modeling the Rough Surface Effect on Interconnect Capacitance", 2004, IEEE.
Zhu, et al., "A Study of Double Exposure Process Design with Balanced Performance Parameters for Line/Space Applications", 2007, SPIE Proceeding Series, vol. 6520; 65202H.
Zuchowski, et al., "A Hybrid ASIS and FPGA Architecture", 2003, IEEE, pp. 187-194.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 2003.
Aubusson, Russel, "Wafer-Scale Integration of Semiconductor Memory," Apr. 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1997.
Cao, Ke, "Design for Manufacturing (DFM) in Submicron VLSI Design," Aug. 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 2007.
Deng, Liang et al., "Coupling-aware Dummy Metal Insertion for Lithography," p. 1, col. 2, 2007.
Devoivre et al., "Validated 90nm CMOS Technology Platfoir 1 with Low-k Copper Interconnects for Advanced System-on-Chip (SoC)," 2002.
Enbody, R. J., "Near-Optimal n-Layer Channel Routing," 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," 2008.
Gupta et al., "Modeling Edge Placement Error Distribution in Standard Cell Library," Feb. 23-24, 2006.
Grad, Johannes et al., "A standard cell library for student projects," Proceedings of the 2003 IEEE International Conference on Microelectronic Systems Education, Jun. 2, 2003.

(56) References Cited

OTHER PUBLICATIONS

Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurata et al., "A Genuine Design Manufacturability Check for Designers," 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of ISQED," pp. 586-591, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, 2003.
Liebmann, Lars et al., "TCAD development for lithography resolution enhancement," Sep. 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2), 1995.".
Muta et al., "Manufacturability-Aware Design of Standard Cells," pp. 2686-2690, Figs. 3, 12, Dec. 2007.
Na, Kee-Yeol et al., "A Novel Single Polysilicon EEPROM Cell With a Polyfinger Capacitor," Nov. 30, 2007.
Pan et al., "Redundant Via Enahnced Maze Routing for Yield Improvement," 2005.
Park, Tae Hong, "Characterization and Modeling of Pattern Dependencies in Copper Interconnects for Integrated Circuits," Ph.D. Thesis, MIT, 2002.
Patel, Chetan, "An Architectural Exploration of Via Patterned Gate Arrays (CMU Master's Project)," May 2003.
Pease, R. Fabian et al., "Lithography and Other Patterning Techniques for Future Electronics," 2008.
Serrano, Diego Emilio, Pontificia Universidad Javeriana Facultad De Ingenieria, Departamento De Electronica, "Diseño De Multiplicador 4 X 8 en VLSI, Introduccion al VLSI," 2006.
Pramanik, "Impact of layout on variability of devices for sub 90nm technologies," 2004.
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements For 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.
Tang, C. W. et al., "A compact large signal model of LDMOS," 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, 2001.
Torres, J. A. et al., "RET Compliant Cell Generation for sub-130nm Processes," 2002.
Uyemura, John P., "Introduction to VLSI Circuits and Systems," Chapters 2, 3, 5, and Part 3, 2002.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," 2006.
Wang, Dunwei et al., "Complementary Symmetry Silicon Nanowire Logic: Power-Efficient Inverters with Gain," 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, 2007.
Weste, Neil et al., "CMOS VLSI Design: A Circuits and Systems Perspective, 3rd Edition," May 21, 2004.
Wingerden, Johannes van, "Experimental verification of proved printability for litho-driven designs," Mar. 14, 2005.
Wong, Alfred K., "Microlithography: Trends, Challenges, Solutions,, and Their Impact on Design," 2003.
Xu, Gang, "Redundant-Via Enhanced Maze Routing for Yield Improvement," 2005.
Yang, Jie, "Manufacturability Aware Design," pp. 93, 102, Fig. 5.2, 2007.
Yongshun, Wang et al., "Static Induction Devices with Planar Type Buried Gate," 2004.
Zobrist, George (editor), "Progress in Computer Aided VLSI Design: Implementations (Ch. 5)," 1990.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.

* cited by examiner

METHODS FOR CONTROLLING MICROLOADING VARIATION IN SEMICONDUCTOR WAFER LAYOUT AND FABRICATION

CLAIM OF PRIORITY

This application claims priority under 35 U.S.C. 119(e) to U.S. Provisional Patent Application No. 61/085,800, filed Aug. 1, 2008, entitled "Methods for Controlling Microloading Variation in Semiconductor Wafer Layout and Fabrication," the disclosure of which is incorporated herein by reference in its entirety.

BACKGROUND

In the fabrication of semiconductor devices such as integrated circuits, memory cells, and the like, a series of manufacturing operations are performed to define features within a chip on a semiconductor wafer ("wafer" hereafter). The chip on the wafer includes integrated circuit devices in the form of multi-level structures defined on a silicon substrate. At a substrate level of the chip, transistor devices with diffusion regions are formed. In subsequent levels of the chip, interconnect metallization lines are patterned and electrically connected to the transistor devices to define a desired integrated circuit device. Also, patterned conductive layers are insulated from other conductive layers by dielectric materials.

The series of manufacturing operations for defining features within the chip on the wafer can include an etching process in which particular portions of a material layer are etched away from the surface of the wafer, such that remaining portions of the material layer form structures to be used in the integrated circuit device. In the etching process, variations in the size and location of areas to be etched away from the surface of the wafer can cause differences in the rate at which material is etched away from one area relative to another area. The variations in the size and location of areas to be etched away from the surface of the wafer is referred to as microloading variation. Therefore, microloading variation across the wafer can cause differences in etch rate across the wafer.

The etching process should continue until each area is etched to completion. Therefore, if a given area is etched to completion faster than other areas, due to differences in etch rate across the wafer caused by microloading variation, the given area will be subjected to a localized overetch period. During the localized overetch period, etching by-products from the etching environment may settle within the given area causing a variation in dimension of the given area, which may correspond to an adverse change in critical dimension of a structure to be defined on the wafer in relation to the given area. Therefore, microloading variation in a given layout to be utilized in an etching process on a wafer may adversely effect dimensional characteristics of correspondingly fabricated structures on the wafer.

SUMMARY

In one embodiment, a method is disclosed for controlling microloading variation in a semiconductor wafer layout. The method includes an operation for defining a first layout that includes both permanent layout features and a number of sacrificial layout features. The method also includes an operation for fabricating structures corresponding to both the permanent layout features and the number of sacrificial layout features of the first layout in a target material layer on a wafer. The method further includes an operation for defining a second layout to remove structures corresponding to the sacrificial layout features. The method also includes an operation for utilizing the second layout to remove the structures corresponding to the sacrificial layout features from the target material layer on the wafer.

In another embodiment, a method is disclosed for controlling microloading variation in a semiconductor wafer layout. The method includes an operation for identifying a first open area in a layout having a size variation relative to one or more neighboring open areas of the layout sufficient to cause adverse microloading variation. The method also includes an operation for repositioning a number of layout features within the layout so as to interdict the first open area such that the size variation of the first open area relative to the one or more neighboring open areas is reduced.

In another embodiment, a method is disclosed for controlling microloading variation in a semiconductor wafer layout. The method includes an operation for identifying a first open area in a layout having a size variation relative to one or more neighboring open areas of the layout sufficient to cause adverse microloading variation. The method also includes an operation for defining and placing dummy layout features within the first open area so as to shield actual layout features in the layout neighboring the first open area from adverse microloading variation.

Other aspects and advantages of the invention will become more apparent from the following detailed description, taken in conjunction with the accompanying drawings, illustrating by way of example the present invention.

DETAILED DESCRIPTION

Figure 1A:
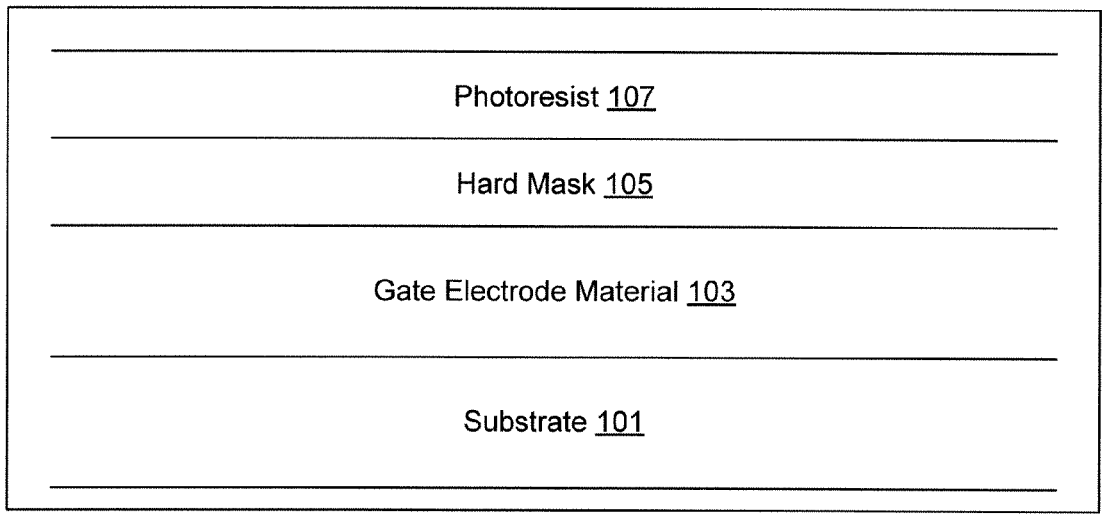
FIG. 1A shows an exemplary wafer having been prepared for a subtractive etch process.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A semiconductor fabrication process may include a subtractive etch process in which portions of a given material layer are etched away from the semiconductor wafer ("wafer" hereafter) to leave selected features defined by the given material layer on the wafer. A layout associated with the selected features to be formed through the subtractive etch process may influence the performance of the subtractive etch process. For example, a layout defined to form polygon shapes through a subtractive etch process may cause an etch rate to vary sufficiently over an area of the wafer such that suboptimal polygon shapes are formed. It should be understood that the etch rate as referenced herein refers to a rate at which material is removed from the exposed surface of the wafer.

A variation in shape density or pattern within a mask to be used in a subtractive etch process may cause the etch rate to vary across the mask. More specifically, shape density or pattern variation across the mask corresponds to a spatial variation in the size of wafer surface areas to be etched, which in turn may cause some wafer surface areas to etch at a different rate than other wafer surface areas. Therefore, some wafer surface areas may be etched through before others. Because the etching process needs to continue until the wafer surface area of slowest etch rate is etched to completion, the wafer surface areas of faster etch rate will be exposed to the etching process and associated environment for a longer duration than necessary. If a given wafer surface area is etched through but continues to be exposed to the etching process and associated environment, etching byproducts from the processing environment may deposit within the etched cavity of the given wafer surface area, thereby forming undesirable sidewall deposition within the etched cavity of the given wafer surface area.

Sidewall deposition can cause a variation in critical dimension of features to be defined on the wafer through the subtractive etch process. Such variation in feature critical dimension may cause adverse electrical performance of fabricated devices or even device failure. Therefore, it is of interest to maintain the etch rate as uniform as possible across portions of the wafer where functional features are to be defined.

In view of the foregoing, it should be understood that spatial variation in the size and relative location of wafer surface areas to be etched may cause a corresponding variation in etch rate. The spatial variation in the sizes and relative locations of wafer surface areas to be etched is referred to herein as microloading. Therefore, variation in microloading across the wafer surface may cause corresponding variation in etch rate across the wafer surface, which may in turn cause undesirable artifacts to be formed across the wafer surface, such as sidewall deposition.

Figure 1B:
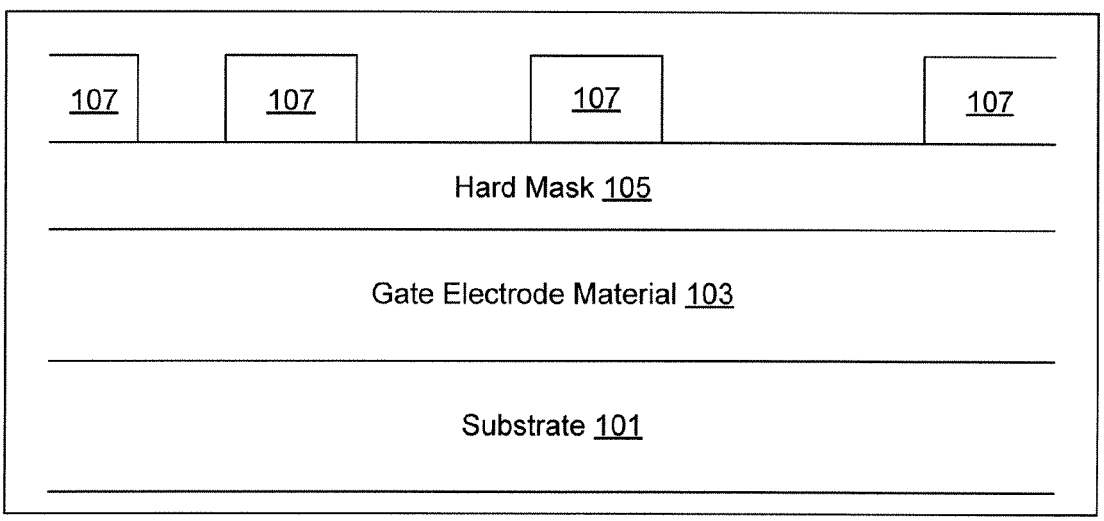
FIG. 1B shows the exemplary wafer of FIG. 1A following patterning and development of the photoresist layer.

FIGS. 1A-1F illustrate the above-described situation in which variation in microloading across the wafer surface causes variation in etch rate and corresponding undesirable artifacts. FIG. 1A shows an exemplary wafer having been prepared for a subtractive etch process. The wafer includes a substrate 101, a gate electrode material layer 103 disposed over the substrate 101, a hard mask layer 105 disposed over the gate electrode material layer 103, and a photoresist layer 107 disposed over the hard mask layer 105. FIG. 1B shows the exemplary wafer of FIG. 1A following patterning and development of the photoresist layer 107. In one embodiment, the photoresist layer 107 is lithographically patterned using a mask defined for a given feature layout to be formed on the wafer. Development of the photoresist layer 107 leaves a pattern of photoresist on the hard mask layer 105 corresponding to the mask pattern.

Figure 1C:
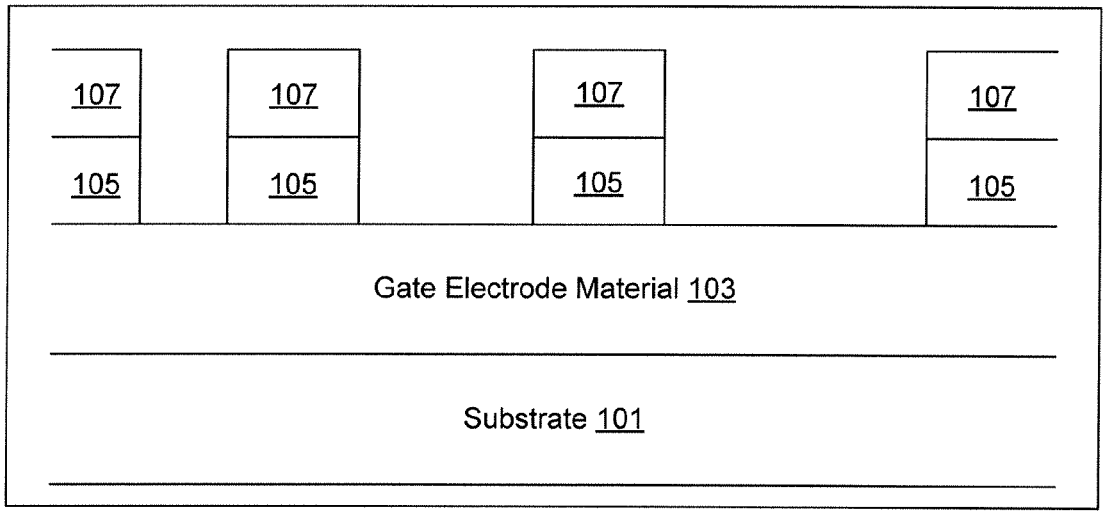
FIG. 1C shows the exemplary wafer of FIG. 1B following an etching process to remove portions of the hard mask layer that are exposed.
Figure 1D:
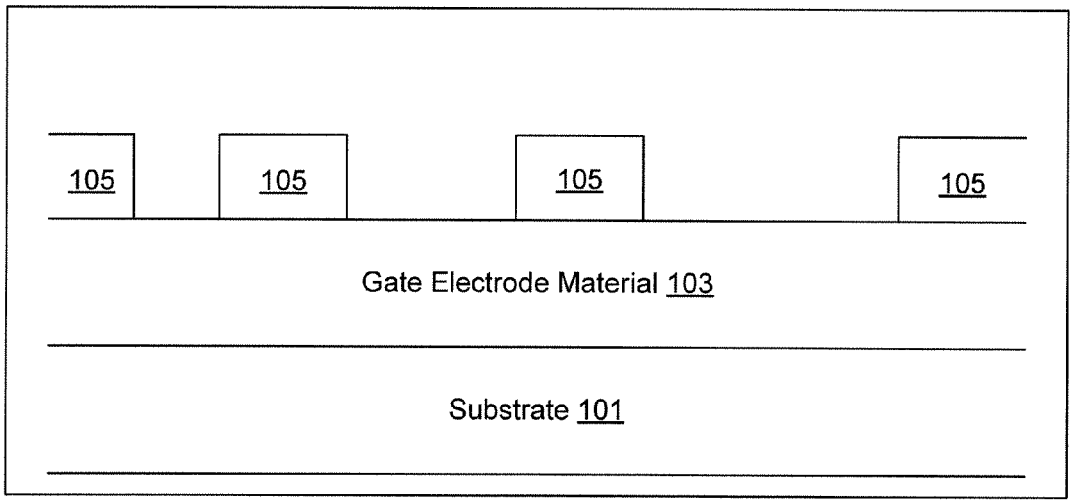
FIG. 1D shows the exemplary wafer of FIG. 1C following a stripping of the remaining photoresist.

FIG. 1C shows the exemplary wafer of FIG. 1B following an etching process to remove portions of the hard mask layer 105 that are exposed, i.e., that are not protected by the remaining pattern of photoresist 107. Therefore, the remaining hard mask 105 generally corresponds to the mask pattern formed within the photoresist layer 107. FIG. 1D shows the exemplary wafer of FIG. 1C following a stripping of the remaining photoresist 107. The remaining hard mask 105 serves to protect underlying wafer areas from another etching process defined to remove the exposed gate electrode material 103. Therefore, the pattern defined by the remaining hard mask 105 features will be also be formed within the gate electrode material layer 103.

Figure 1E:
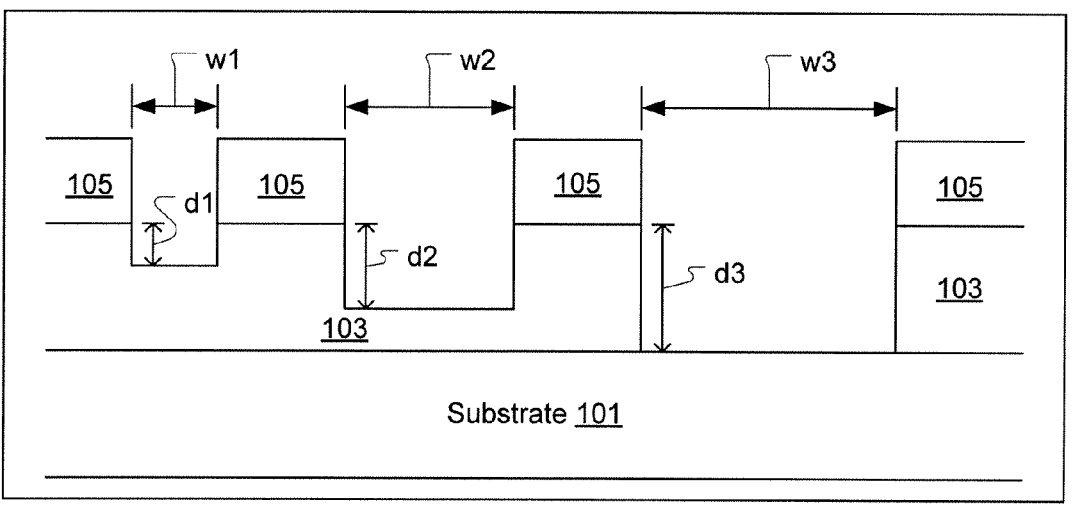
FIG. 1E shows microloading defined by the wafer surface areas to be etched.

In the exemplary embodiment, effects of variation in microloading become apparent in the etching of the gate electrode material 103. As shown in FIG. 1E, the microloading is defined by the wafer surface areas to be etched, which respectively correspond to areas of widths w1, w2, and w3. The exposed (i.e., etchable) wafer surface areas of larger size (i.e., width w3 relative to widths w2 and w1, and width w2 relative to width w1) will generally experience a faster etch rate than the areas of smaller size. Therefore, when the gate electrode material 103 within the area of width w3 is completely etched through a full depth d3, the gate electrode material 103 within the areas of widths w1 and w2 are only etched to depths of d1 and d2, respectively, which is not sufficient to terminate the etching process, as each of the surfaces areas of widths w1, w2, and w3 need to be etched through to the full depth d3. Therefore, the etching process continues until the wafer surface area of smallest size/slowest etch rate (e.g., the area of width w1) is etched through the full depth d3.

Figure 1F:
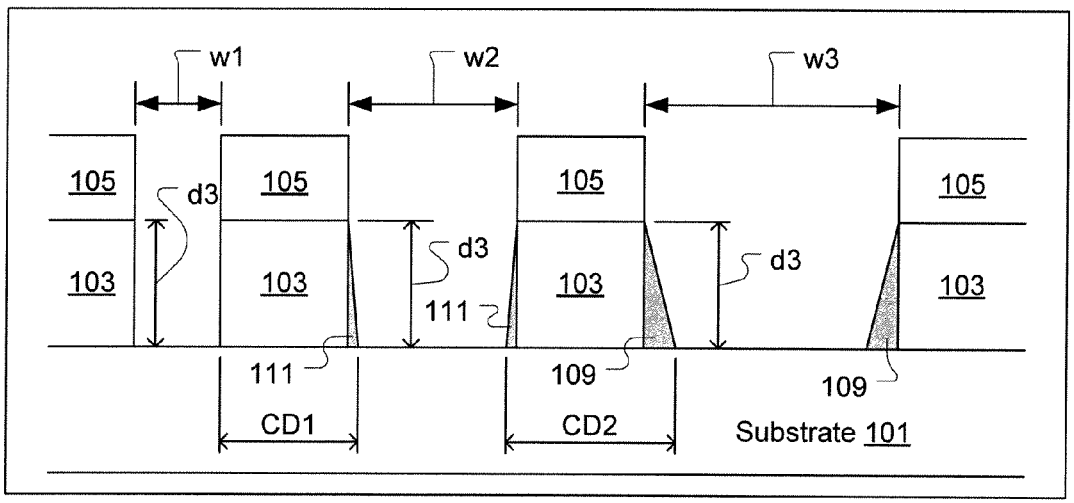
FIG. 1F shows the exemplary wafer of FIG. 1E following a continuation of the etching process.

FIG. 1F shows the exemplary wafer of FIG. 1E following a continuation of the etching process until the wafer surface areas of widths w1 and w2 are etched through the full depth d3. Once a wafer surface area is fully etched to form a trench-like structure, continued exposure of the trench-like structure to the etching environment may cause byproducts of the etching process to settle on surfaces within the trench-like structure, thereby forming sidewall deposition. For example, because the trench-like structures associated with the wafer surface areas of widths w3 and w2 continue to be exposed to the etching process after they are fully etched, sidewall deposition 109 and 111, respectively, may occur therein. Consequently, due to the sidewall deposition 109/111, critical dimensions CD2 and CD1 of resulting gate electrode features may be unsatisfactory.

The present invention provides layout and wafer fabrication methodology embodiments that recognize and prevent undesirable effects resulting from variation in microloading across a given layout to be fabricated on a wafer. For example, in one embodiment, a method is disclosed herein for microloading variation control to limit critical dimension variance in a subtractive etch wafer fabrication process. This particular method involves control of sizing and placement of exposed and etchable wafer surface areas around features to be defined on the wafer, i.e., around features to be left on the wafer through subtractive etching of material present within the exposed and etchable wafer surface areas.

Figure 2A:
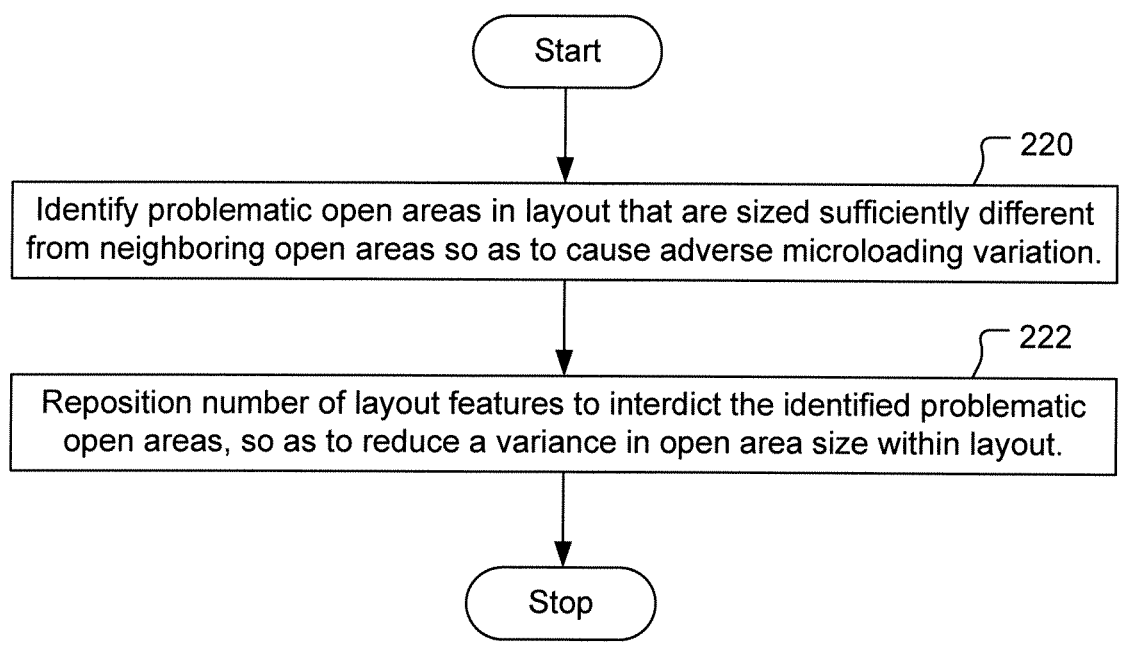
FIG. 2A is an illustration showing a flowchart of a method for controlling microloading variation in a layout, in accordance with one embodiment of the present invention.
Figure 2B:
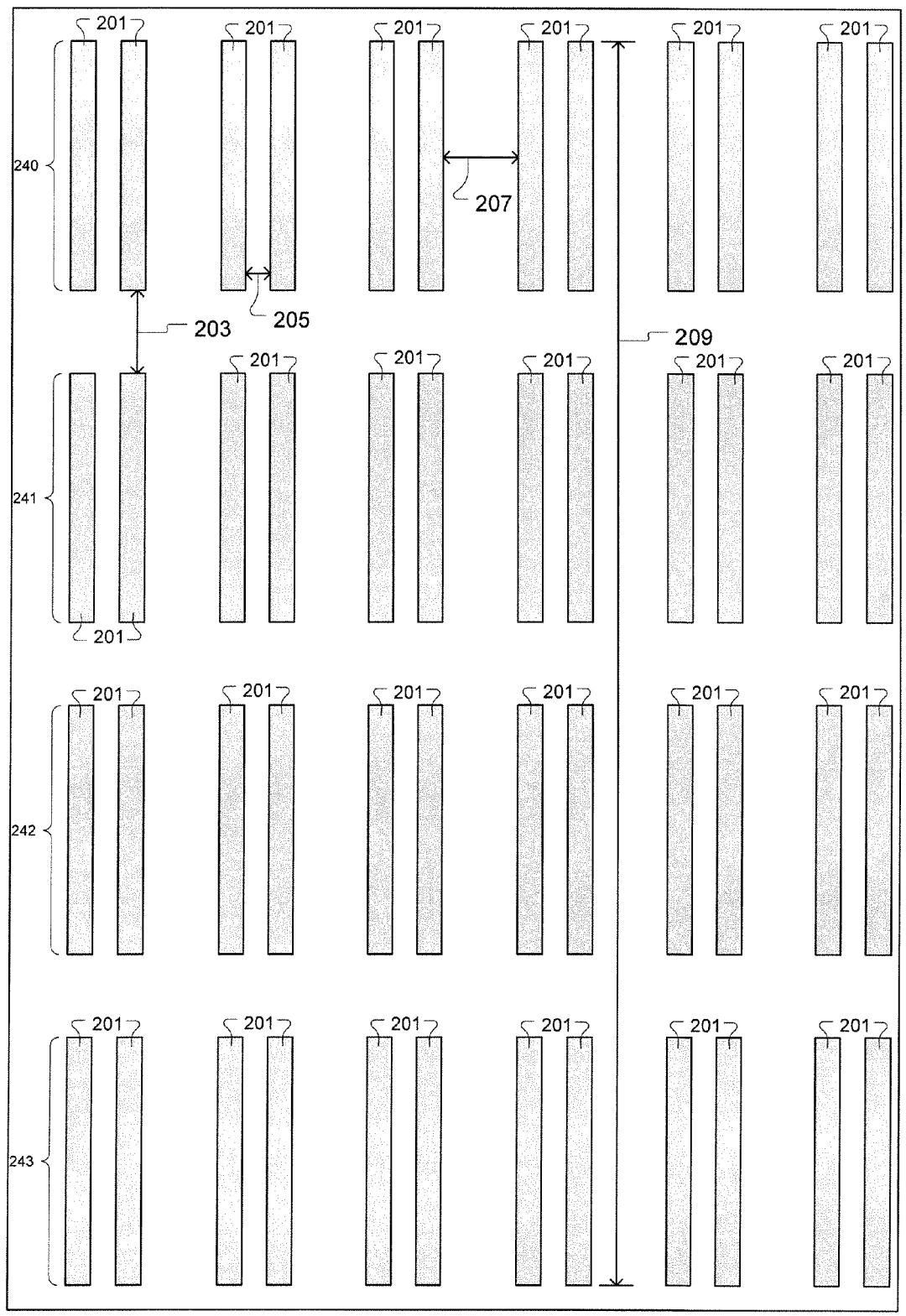
FIG. 2B shows a layout that includes a number of linear shaped features placed in pairs in an array-like manner, in accordance with one embodiment of the present invention.

FIG. 2A is an illustration showing a flowchart of a method for controlling microloading variation in a layout, in accordance with one embodiment of the present invention. The method includes an operation 220 for identifying problematic open areas in a layout that are sized sufficiently different from neighboring open areas in the layout so as to cause adverse microloading variation. For example, FIG. 2B shows a layout that includes a number of linear shaped features 201 placed in pairs in an array-like manner. Specifically, each pair of closely spaced adjacent linear shaped features 201 are separated from each other by a distance 205. Also, each pair of closely spaced adjacent linear shaped features 201 are separated from neighboring pairs of closely spaced adjacent linear shaped features 201 by distances 207 and 203. The separation distance 207 extends perpendicularly between linear shaped features 201 within a given row of linear shaped features 201, where the exemplary layout of FIG. 2B includes rows 240, 241, 242, 243 of linear shaped features 201. The separation distance 203 extends between ends of linear shaped features 201 in adjacent rows 240, 241, 242, 243.

Because the linear shaped features 201 in adjacent rows 240, 241, 242, 243 are placed in an end-to-end manner, the separation distance 207 forms a problematic open area 209 that extends parallel to the linear shaped features 201 and that is sized sufficiently different from the separation distance 205 of neighboring open areas so as to cause adverse microloading variation within the layout. It should be appreciated that separation distance 207 may already be set at a minimum allowable size given layout rules associated with electrostatic discharge. Therefore, it may not be possible to simply reduce the separation distance 207 in an attempt to reduce the microloading variation within the layout. However, the method includes another operation 222 for repositioning a number of layout features to interdict the identified problematic open areas as identified in operation 220. It should be understood that interdiction of the identified problematic open areas with repositioned layout features will serve to reduce a variance in open area size within the layout, and thereby serve to reduce the variation in microloading within the layout.

Figure 2C:
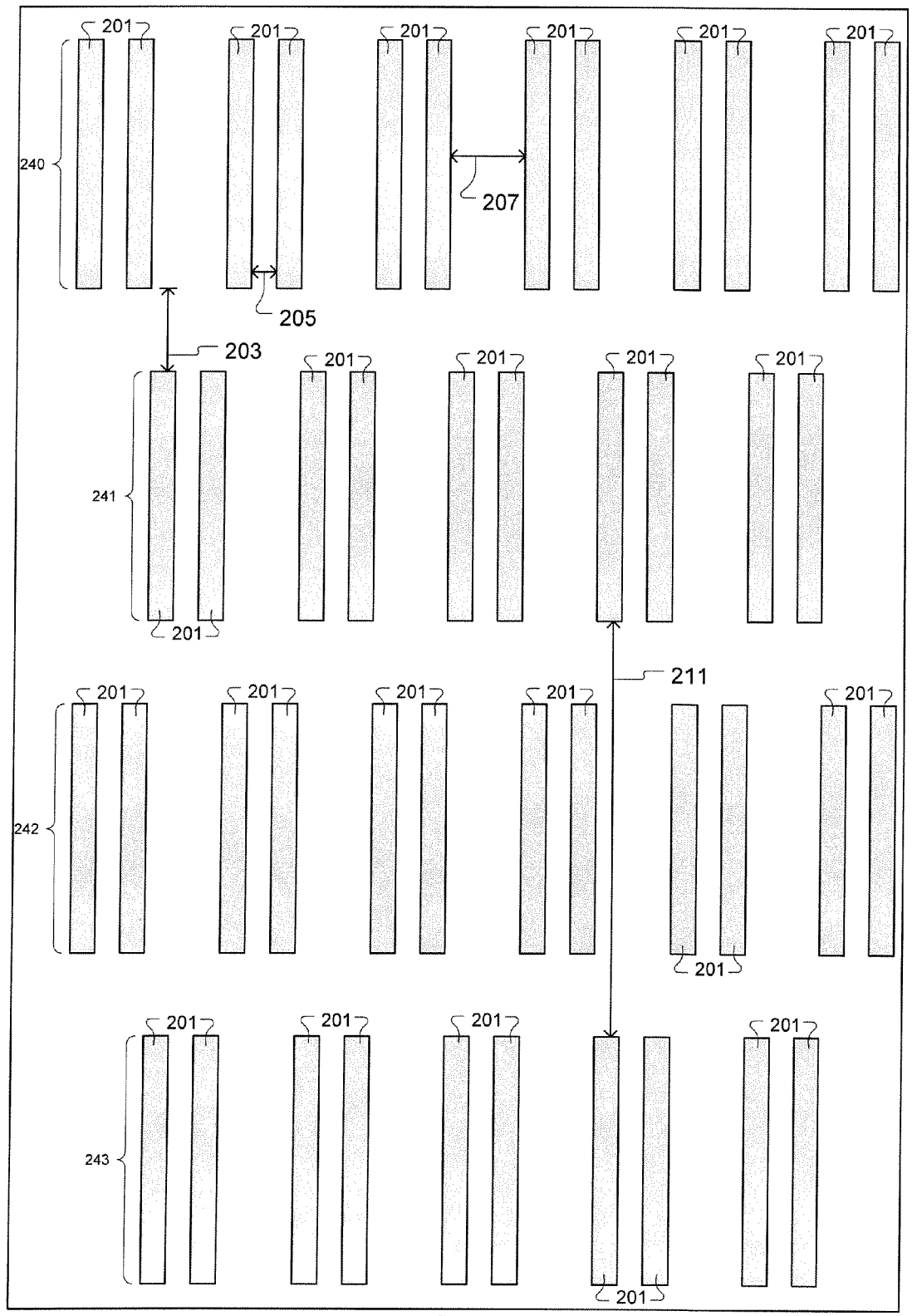
FIG. 2C shows the layout of FIG. 2B with the linear shaped features in particular rows shifted to interdict the problematic open area, in accordance with one embodiment of the present invention.

FIG. 2C shows the layout of FIG. 2B with the linear shaped features 201 in each of rows 241 and 243 shifted to interdict the problematic open area 209. As a result, the problematic open area 209 is eliminated in exchange for an open area 211 having a size smaller than the problematic open area 209. Therefore, with the linear shaped features 201 in each of rows 241 and 243 shifted to interdict the problematic open area 209, the microloading variation within the layout is reduced, thereby providing a corresponding reduction in the potential for adverse effects on critical dimension.

Figure 3A:
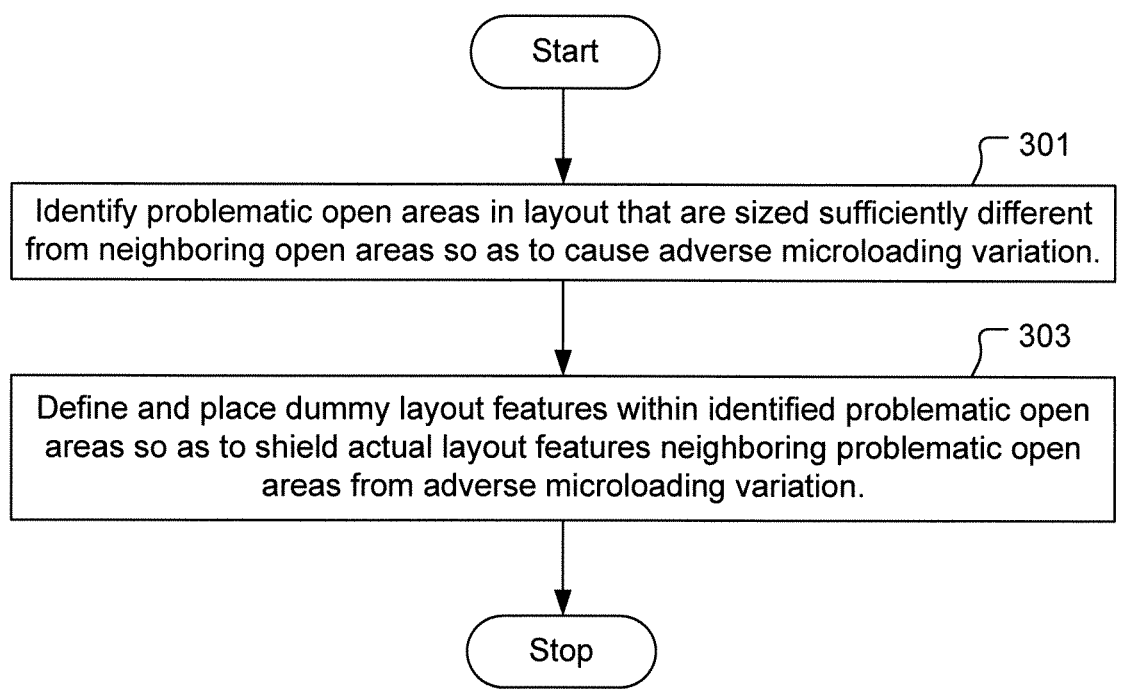
FIG. 3A is an illustration showing a flowchart of a method for utilizing dummy layout features to control microloading variation in a layout, in accordance with another embodiment of the present invention.
Figure 3B:
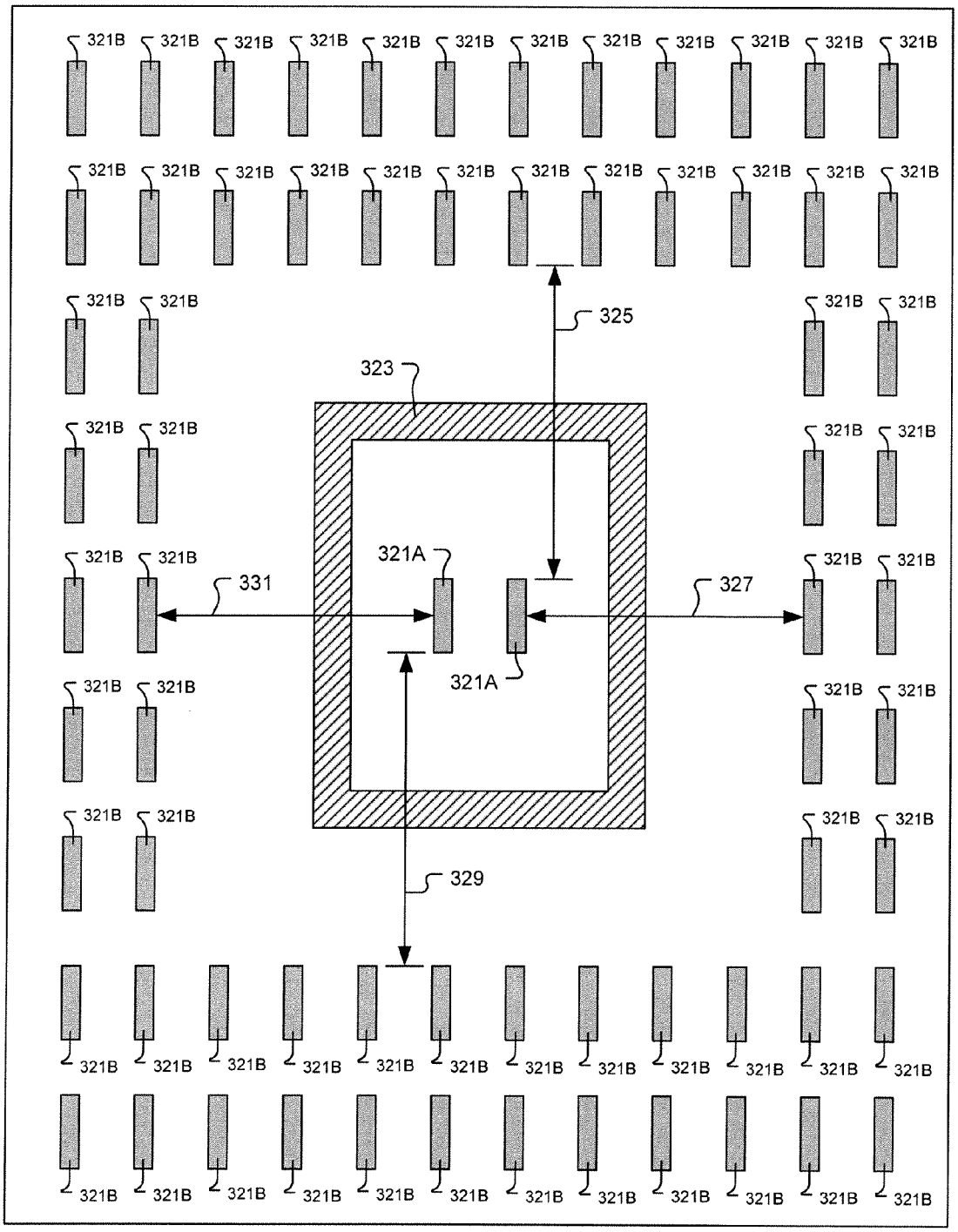
FIG. 3B shows a gate level layout that includes a pair of linear gate electrode features placed within an isolation guard ring, in accordance with one embodiment of the present invention.

FIG. 3A is an illustration showing a flowchart of a method for utilizing dummy layout features to control microloading variation in a layout, in accordance with another embodiment of the present invention. The method includes an operation 301 for identifying problematic open areas in a layout that are sized sufficiently different from neighboring open areas in the layout so as to cause adverse microloading variation. For example, FIG. 3B shows a gate level layout that includes a pair of linear gate electrode features 321A placed within an isolation guard ring 323, wherein the isolation guard ring 323 is defined within the substrate. A number of additional linear gate electrode features 321B are defined outside of the isolation guard ring 323.

Within the gate level layout of FIG. 3B, the linear gate electrodes 321A within the isolation guard ring 323 are separated from the linear gate electrodes 321B outside the isolation guard ring 323 by an open area defined by distances 325, 327, 329, and 331. Due to sizing differences between this open area and the spacings between adjacently placed linear gate electrode features 321A/321B, there is a potential for adverse microloading variation within the gate level layout. To address this potential for adverse microloading variation, the method of FIG. 3A includes another operation 303 for defining and placing dummy layout features within identified problematic open areas of the layout, so as to shield actual layout features which neighbor the problematic open areas of the layout from the effects of adverse microloading variation. The dummy layout features referred to herein correspond to physical structures defined on the semiconductor wafer that are not connected within an electrical circuit.

Figure 3C:
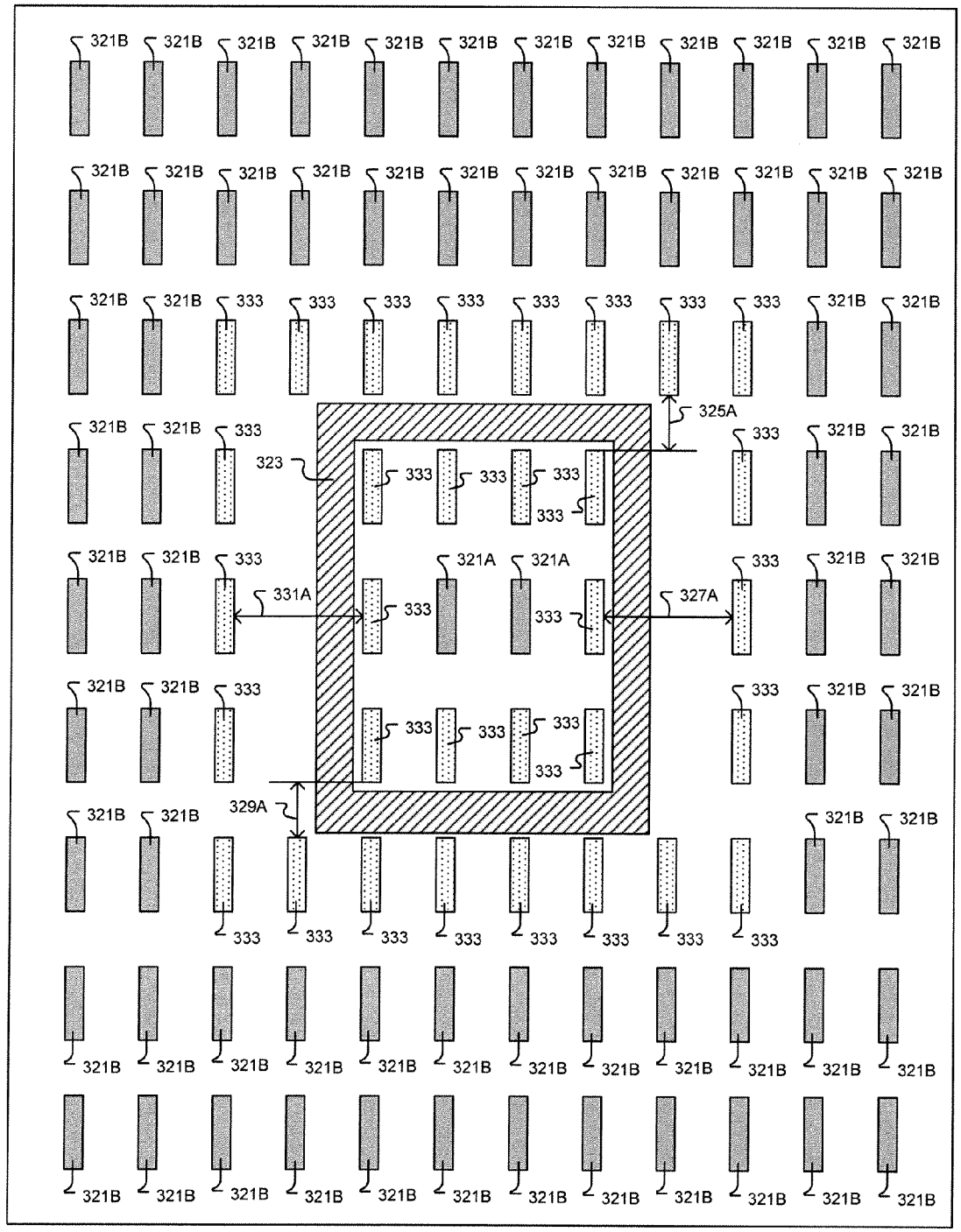
FIG. 3C shows the gate level layout of FIG. 3B with a number of dummy layout features defined and placed within the identified problematic open area of the layout, so as to shield actual layout features which neighbor the problematic open area of the layout from the effects of adverse microloading variation, in accordance with one embodiment of the present invention.

For example, FIG. 3C shows the gate level layout of FIG. 3B with a number of dummy layout features 333 defined and placed within the identified problematic open area of the layout, so as to shield actual layout features 321A/321B which neighbor the problematic open area of the layout from the effects of adverse microloading variation. Specifically, dummy layout features 333 are placed next to the gate electrode features 321A/321B and within the problematic open area, such that a spacing between the gate electrode features 321A/321B and their proximally placed dummy layout features 333 are substantially similar to a regular spacing that exists between neighboring gate electrode features 321A and 321B, respectively. Therefore, the problematic open area within the layout of FIG. 3B is reduced in size. Specifically, the open area distances 325, 327, 329, 331 are reduced to distances 325A, 327A, 329A, 331A, respectively.

It should be appreciated that the method of FIG. 3A can be utilized with essentially any layout portion of essentially any chip level in which the layout portion includes a problematic open area large enough to cause adverse microloading variation. Therefore, it should be understood that the particular gate level layout example of FIGS. 3B-3C is provided by way of example for discussion purposes, and is not intended to convey a limitation of the method of FIG. 3A. Generally speaking, the method of FIG. 3A provides for bounding of a problematic open layout area by dummy layout features, such that actual layout features that surround the problematic open layout area are shielded from the effects of adverse microloading variation by the dummy layout features.

Figure 4A:
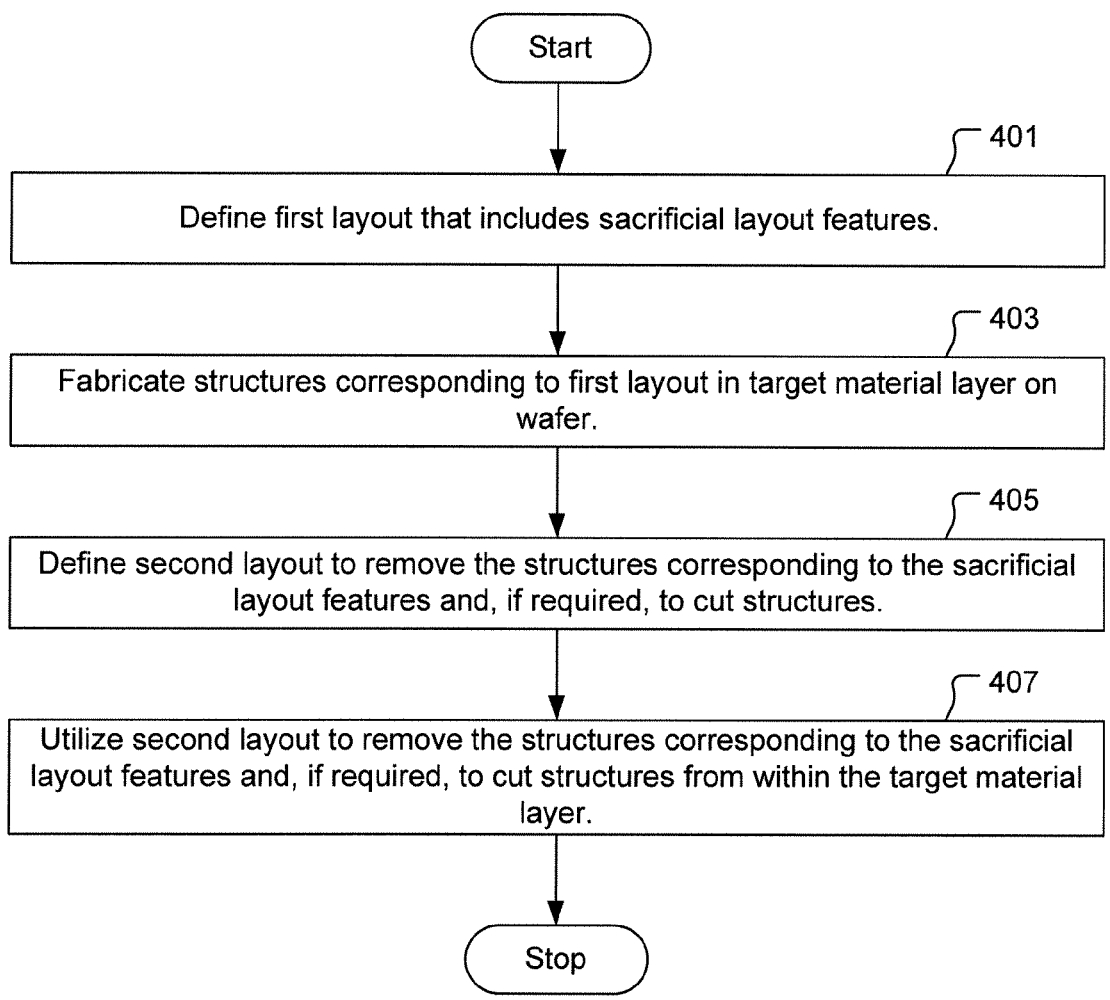
FIG. 4A shows a flowchart of a method for utilizing sacrificial layout features to control microloading variation in a layout, in accordance with another embodiment of the present invention.

FIG. 4A shows a flowchart of a method for utilizing sacrificial layout features to control microloading variation in a layout, in accordance with another embodiment of the present invention. In the method of FIG. 4A, sacrificial layout features correspond to structures that are temporarily defined on the wafer to reduce microloading variation. Thus, sacrificial structures are temporarily fabricated on the wafer to support fabrication of permanent structures corresponding to actual layout features. Following fabrication of the sacrificial structures and permanent structures in a given chip level, the sacrificial structures are removed from the wafer while leaving the permanent structures on the wafer.

The method of FIG. 4A includes an operation 401 for defining a first layout that includes sacrificial layout features. Specifically, the first layout includes layout shapes that correspond to permanent structures to be defined on the wafer, and also includes layout shapes that correspond to sacrificial structures to be defined on the wafer. The layout shapes that correspond to sacrificial structures are defined and placed in the layout so as to reduce or eliminate adverse microloading variation effects and thereby support fabrication of the permanent structures. For example, the sacrificial structures can be defined and placed to limit the variation in size and relative location of open areas in the layout between actual layout features that correspond to permanent structures to be defined on the wafer.

Figure 5A:
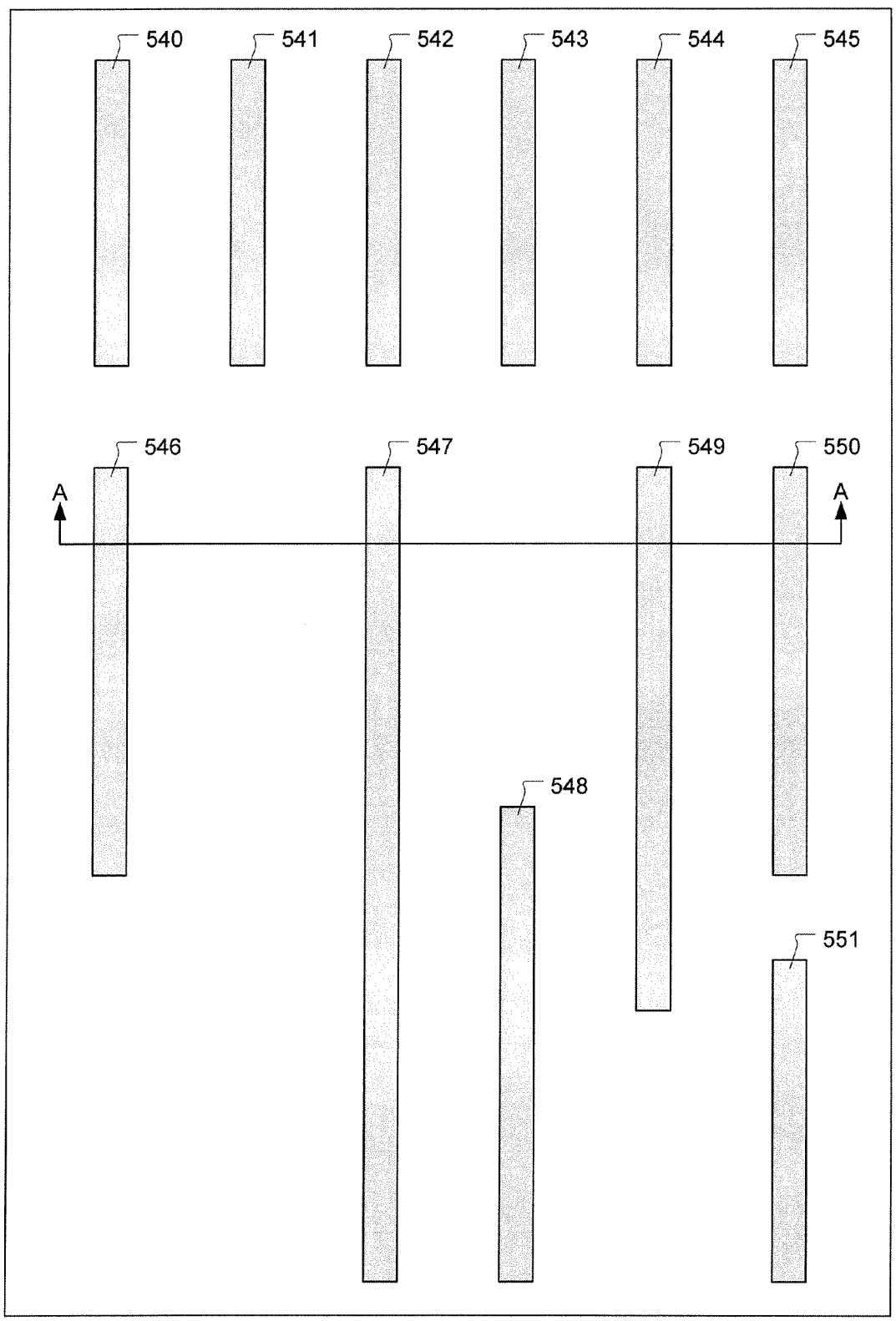
FIG. 5A shows an exemplary final layout to be defined within a target material layer, in accordance with one embodiment of the present invention.
Figure 5B:
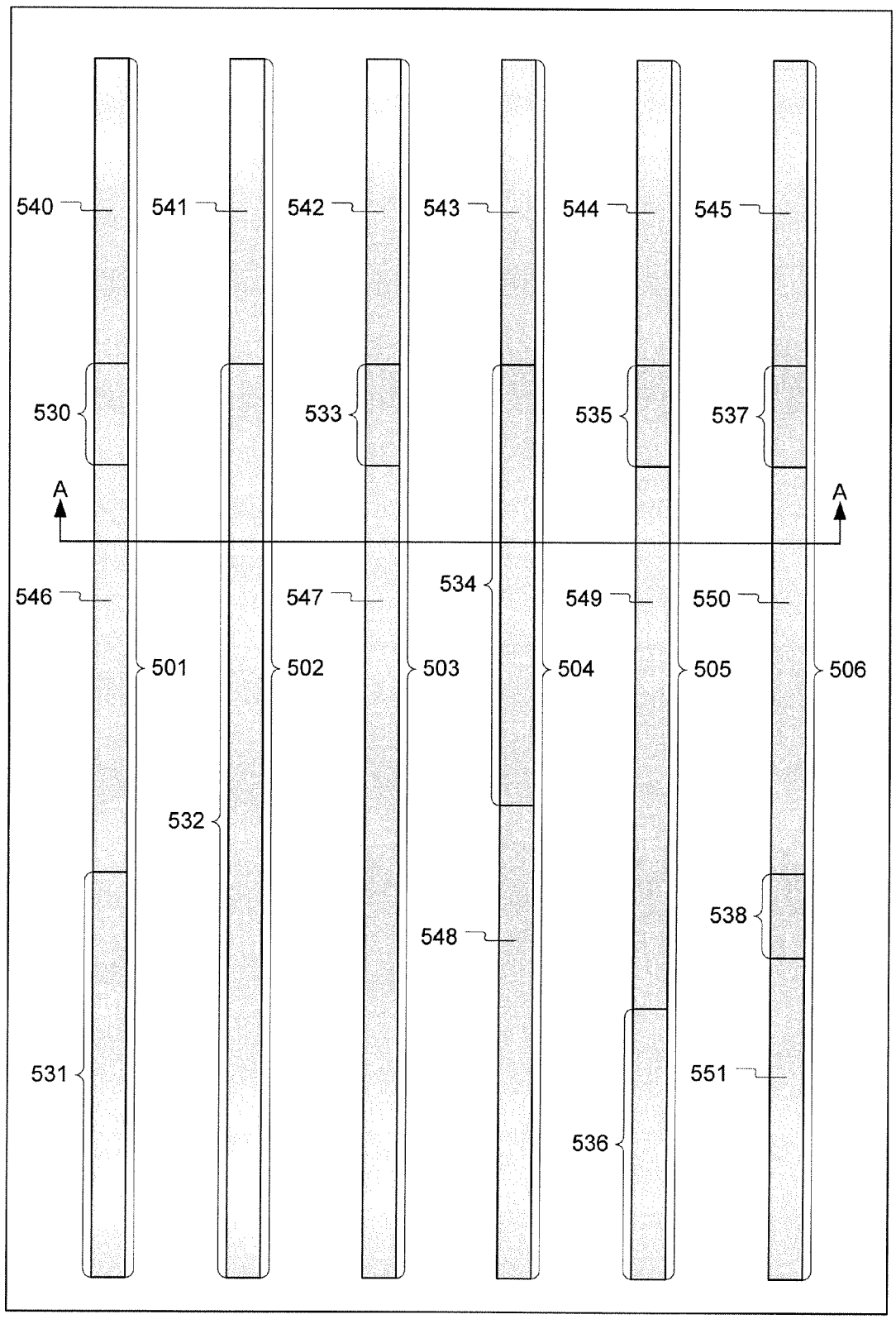
FIG. 5B shows an exemplary first layout pattern that can be used in conjunction with the method of FIG. 4A to fabricate the final layout pattern of FIG. 5A, in accordance with one embodiment of the present invention.

FIG. 5A shows an exemplary final layout to be defined within a target material layer, in accordance with one embodiment of the present invention. The final layout pattern includes linear layout features 540-551. FIG. 5B shows an exemplary first layout pattern that can be used in conjunction with the method of FIG. 4A to fabricate the final layout pattern of FIG. 5A. The first layout pattern of FIG. 5B includes a number of linear layout features 501-506. The linear layout features 501-506 actually include portions that will eventually define permanent structures corresponding to layout features 540-551 of the final layout pattern, and sacrificial layout features 530-538 that will define sacrificial structures to assist in fabrication of layout features 540-551 by reducing microloading variation.

With reference back to FIG. 4A, the method proceeds with an operation 403 for fabricating structures corresponding to the first layout in a target material layer on the wafer. It should be understood that the target material layer can correspond to essentially any type of material used in semiconductor fabrication. It should be further understood that the target material layer can correspond to essentially level of a chip defined on the wafer. In one embodiment, the target material layer is formed of an electrically conductive material, such as polysilicon or metal. For example, in one embodiment, the target material layer is formed of polysilicon, such that permanent structures formed on the wafer from the target material define gate electrodes of transistor devices. In another embodiment, the target material layer is formed of an electrically insulating material, i.e., dielectric material.

Figure 4B:
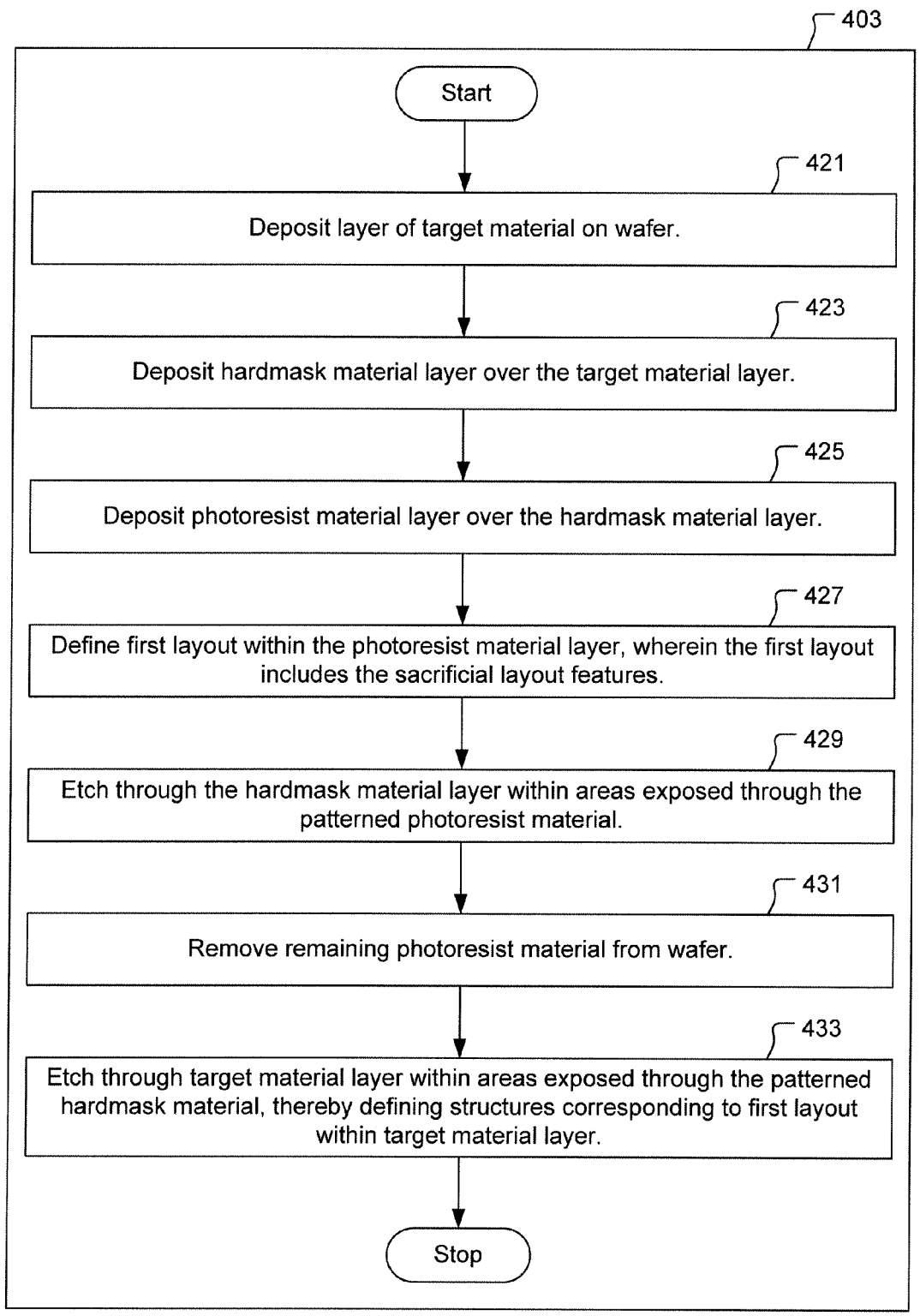
FIG. 4B is an illustration showing a flowchart of a method for fabricating structures corresponding to the first layout in the target material layer on the wafer, in accordance with operation 403, in accordance with one embodiment of the present invention.

FIG. 4B is an illustration showing a flowchart of a method for fabricating structures corresponding to the first layout in the target material layer on the wafer, in accordance with operation 403, and in accordance with one embodiment of the present invention. Also, FIGS. 6A-6E show a series of illustrations depicting results of various operations performed in the method of FIG. 4B. Each of FIGS. 6A-6E depicts a vertical cross-section of an exemplary wafer portion 601 corresponding to a view A-A as identified in each of FIGS. 5A-5C.

Figure 6A:
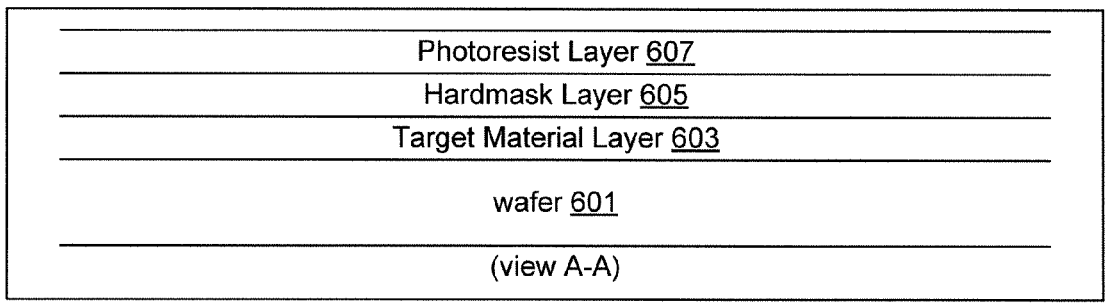
FIG. 6A shows the cross-sectional view A-A following operation 425, in accordance with one embodiment of the present invention.

In the method of FIG. 4B, an operation 421 is performed to deposit a layer of target material on a wafer. In an operation 423, a hardmask material layer is deposited over the target material layer. In an operation 425, a photoresist material layer is deposited over the hardmask material layer. In one embodiment, each of the target material layer, the hardmask material layer, and the photoresist material layer can be deposited on the wafer through a chemical vapor deposition (CVD) process. However, it should be understood that in other embodiments, each of the target material layer, the hardmask material layer, and the photoresist material layer can be respectively deposited through essentially any type of suitable material deposition process. FIG. 6A shows the cross-sectional view A-A following operation 425. Specifically, FIG. 6A shows a target material layer 603 deposited on a wafer 601, a hardmask layer 605 deposited over the target material layer 603, and a photoresist layer 607 deposited over the hardmask layer 605.

Figure 6B:
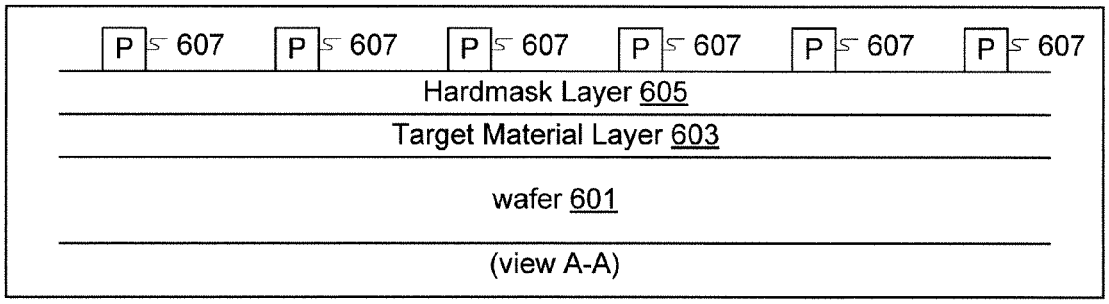
FIG. 6B shows the cross-sectional view A-A following operation 427, in accordance with one embodiment of the present invention.

The method continues with an operation 427 for defining the first layout pattern within the photoresist material layer, such that the first layout pattern as defined within the patterned photoresist material layer can be transferred to the hardmask material layer. For example, in one embodiment the photoresist material layer is exposed to a light pattern corresponding to the first layout pattern. Then the photoresist material layer is developed such that the remaining photoresist material includes exposed areas that correspond to the first layout pattern. FIG. 6B shows the cross-sectional view A-A following operation 427.

Figure 6C:
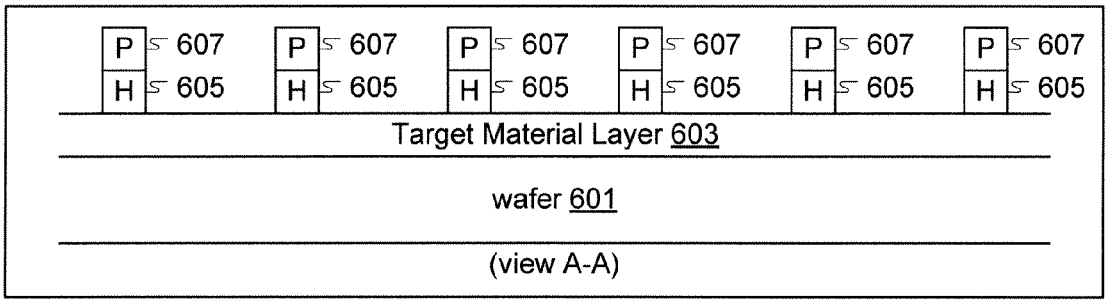
FIG. 6C shows the cross-sectional view A-A following operation 429, in accordance with one embodiment of the present invention.
Figure 6D:
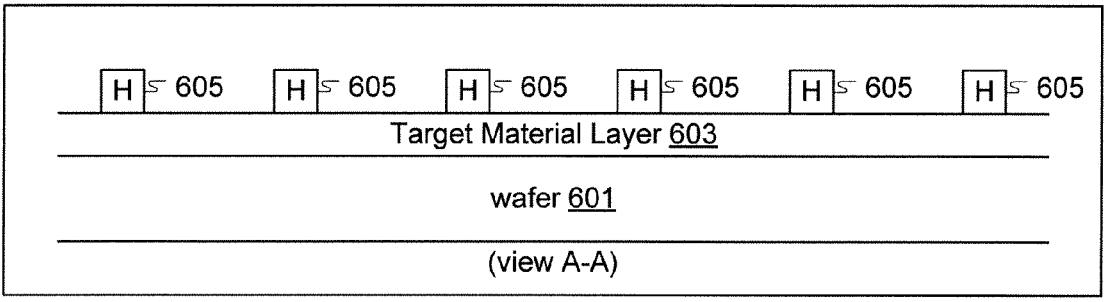
FIG. 6D shows the cross-sectional view A-A following operation 431, in accordance with one embodiment of the present invention.
Figure 6E:
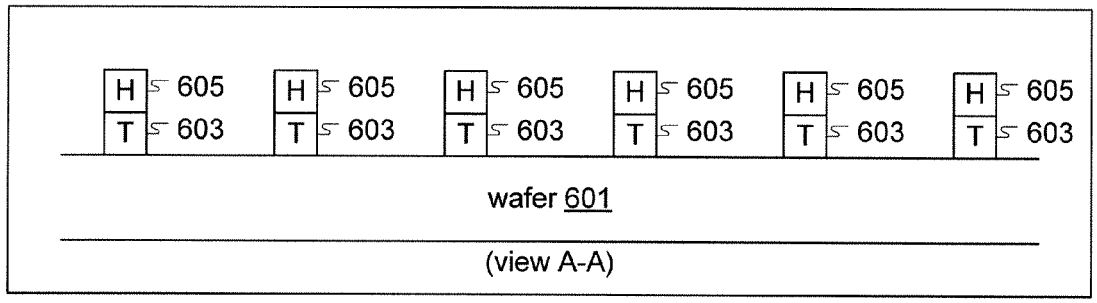
FIG. 6E shows the cross-sectional view A-A following operation 433, in accordance with one embodiment of the present invention.

An operation 429 is then performed to etch through the hardmask material layer within the exposed areas of the patterned photoresist material. FIG. 6C shows the cross-sectional view A-A following operation 429. Then, in an operation 431, the remaining photoresist material is removed. In this manner the first layout pattern is etched within the hardmask material layer. FIG. 6D shows the cross-sectional view A-A following operation 431. An operation 433 is then performed to etch through the conductive material layer within areas exposed through the patterned hardmask material, thereby defining the first layout pattern within the conductive material layer, including the sacrificial layout features. FIG. 6E shows the cross-sectional view A-A following operation 433.

With reference back to the method of FIG. 4A, following the operation 403, the method proceeds with an operation 405 for defining a second layout to remove the sacrificial structures from the target material layer. Also, if required, the second layout is further defined to cut structures within the target material layer, thereby leaving the desired permanent structures. Therefore, the second layout includes openings defined to uncover the sacrificial structures fabricated in the target material layer and, if required, to cut otherwise permanent structures fabricated in the target material layer.

Figure 5C:
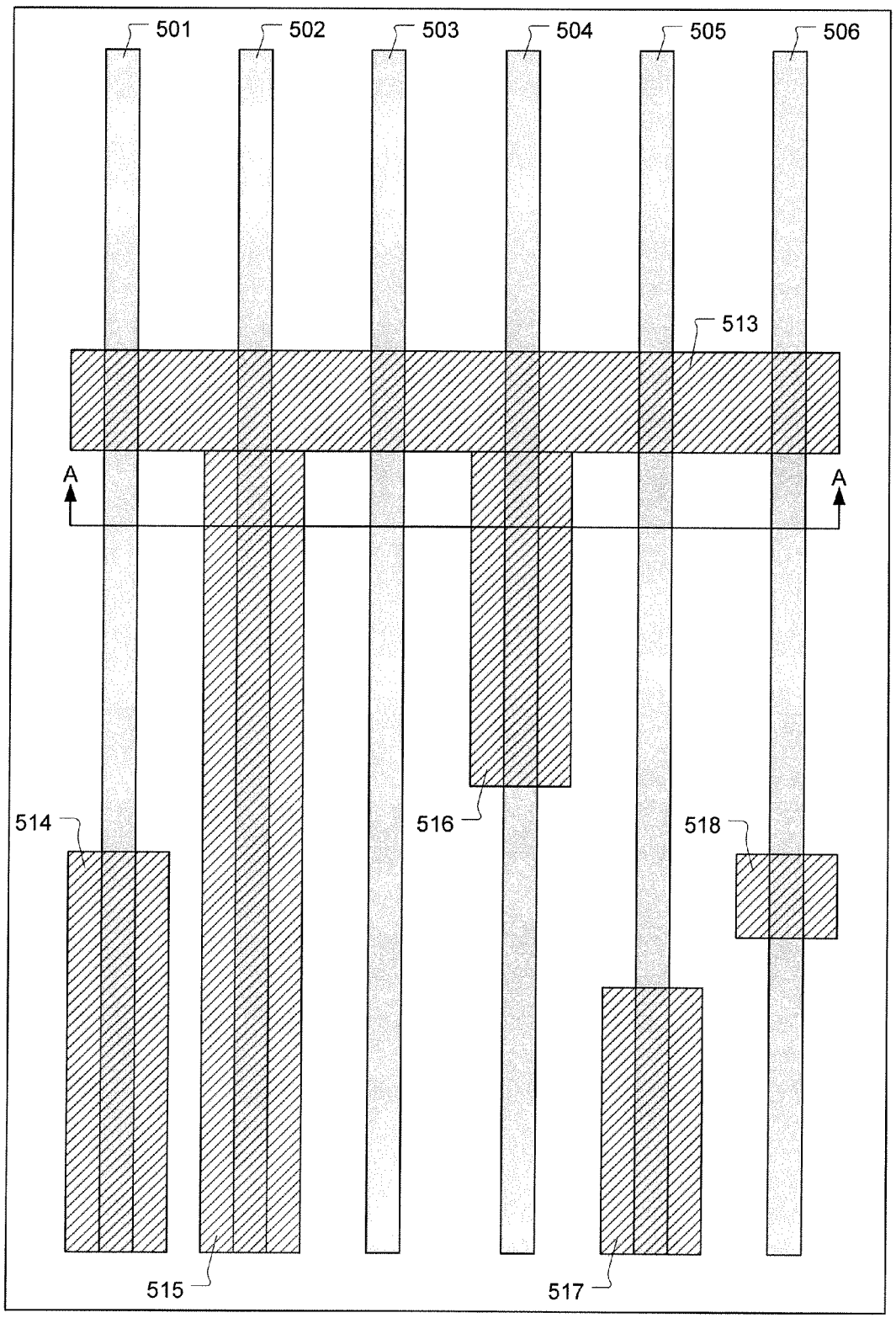
FIG. 5C shows an exemplary second layout pattern that can be used in conjunction with the method of FIG. 4A to fabricate the final layout pattern of FIG. 5A, in accordance with one embodiment of the present invention.

FIG. 5C shows an exemplary second layout pattern that can be used in conjunction with the method of FIG. 4A to fabricate the final layout pattern of FIG. 5A. The second layout pattern of FIG. 5C includes a number of openings 513-518. It should be understood that the linear layout shapes 501-506 are shown in FIG. 5C for contextual purposes and are not actually part of the second layout pattern. Specifically, the second layout pattern in the example of FIG. 5C is defined by the cross-hatched opening shapes 513-518. The openings 513 and 518 in the second layout are defined to enable cutting of structures within the target material layer. The openings 514, 515, 516, 517 are defined to expose the sacrificial structures 531, 532, 534, 536, respectively, so that they can be removed from the target material layer.

Figure 4C:
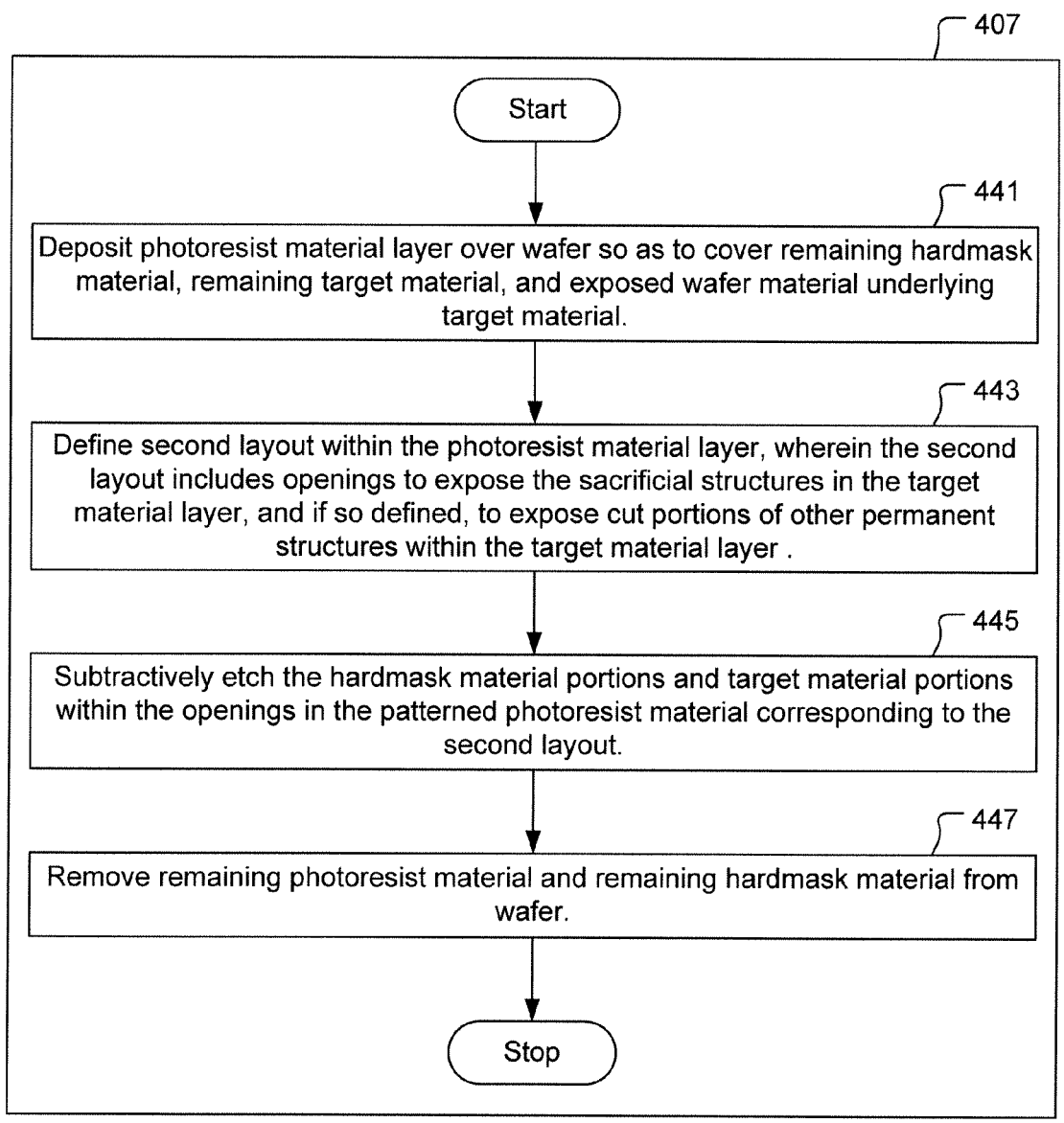
FIG. 4C is an illustration showing a flowchart of a method for utilizing the second layout, in accordance with operation 407, in accordance with one embodiment of the present invention.
Figure 6F:
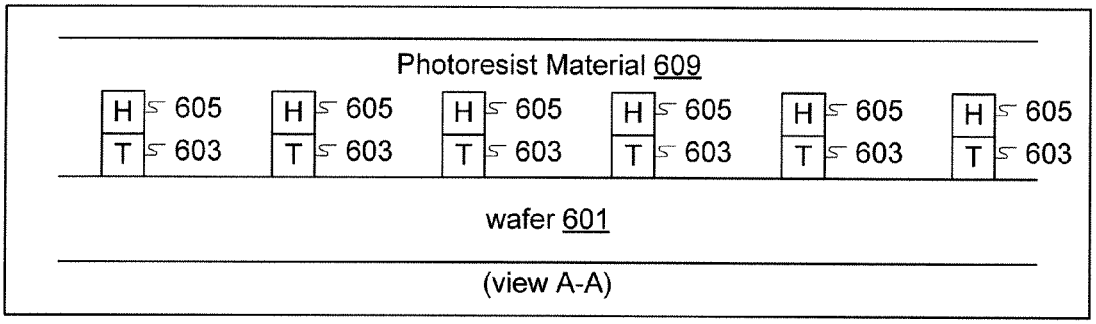
FIG. 6F shows the cross-sectional view A-A following operation 441, in accordance with one embodiment of the present invention.

With reference back to FIG. 4A, the method proceeds with an operation 407 for utilizing the second layout to remove the sacrificial structures from the target material layer, and if so defined, to cut other permanent structures within the target material layer. FIG. 4C is an illustration showing a flowchart of a method for utilizing the second layout, in accordance with operation 407, and in accordance with one embodiment of the present invention. An operation 441 is performed to deposit a photoresist material layer over the wafer so as to cover the remaining hardmask material, the remaining target material, and the exposed wafer material underlying the target material. FIG. 6F shows the cross-sectional view A-A following operation 441. As shown, a photoresist material 609 is deposited over the wafer so as to cover the remaining hardmask material 605, the remaining target material 603, and the exposed wafer 601 underlying the target material.

Figure 6G:
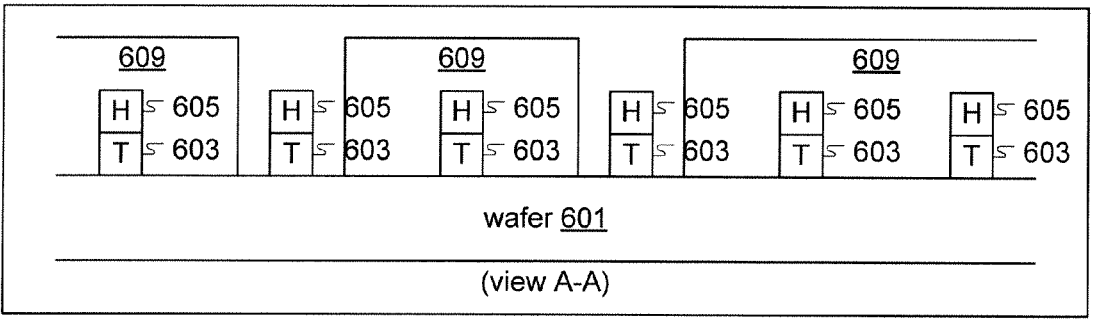
FIG. 6G shows the cross-sectional view A-A following operation 443, in accordance with one embodiment of the present invention.

An operation 443 is then performed to define the second layout within the photoresist material layer, wherein the second layout includes openings to expose the sacrificial structures in the target material layer, and if so defined, to expose cut portions of other permanent structures within the target material layer. FIG. 6G shows the cross-sectional view A-A following operation 443. As shown, the photoresist material 609 is patterned to create open areas which expose sacrificial features 532 and 534.

Figure 6H:
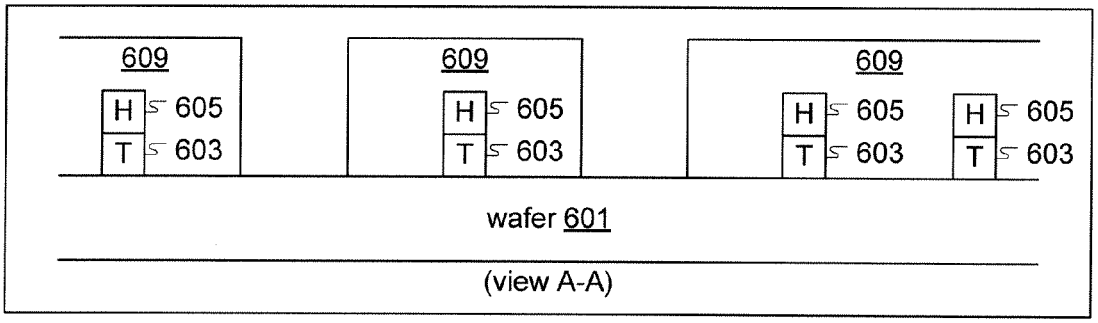
FIG. 6H shows the cross-sectional view A-A following operation 445, in accordance with one embodiment of the present invention.
Figure 6I:
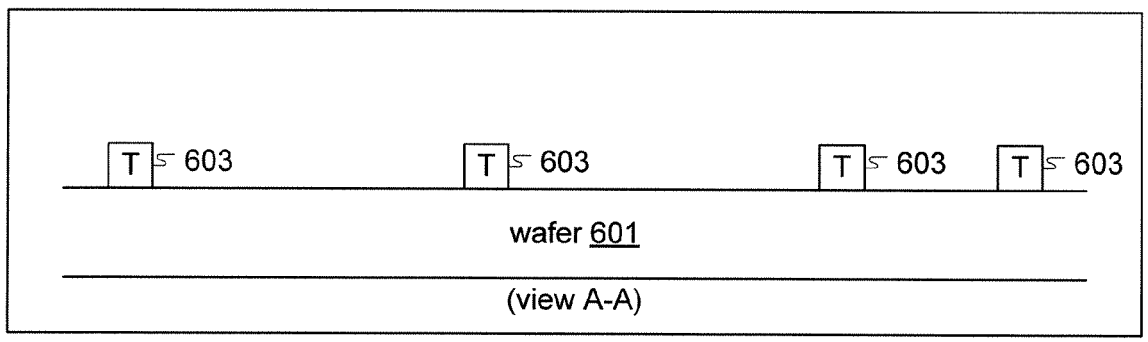
FIG. 6I shows the cross-sectional view A-A following operation 447, in accordance with one embodiment of the present invention.

An operation 445 is then performed to subtractively etch the hardmask material portions and target material portions within the openings in the patterned photoresist material corresponding to the second layout. FIG. 6H shows the cross-sectional view A-A following operation 445. As shown, the hardmask material 605 and target material 603 within the openings in the patterned photoresist material 609 are removed through subtractive etching. An operation 447 is then performed to remove the remaining photoresist material and the remaining hardmask material from the wafer. FIG. 6I shows the cross-sectional view A-A following operation 447. As shown, the remaining photoresist material 609 and the remaining hardmask material 605 are removed through subtractive etching, thereby leaving the target material 603 corresponding to permanent structures 546, 547, 549, and 550. As previously mentioned, the final layout pattern of FIG. 5A represents the permanent structures formed on the wafer from the target material.

In one embodiment, the first layout referenced in operations 401 and 403 of the method of FIG. 4A includes all layout features corresponding to the permanent structures to be defined on the wafer, in addition to a number of layout features corresponding to appropriate sacrificial structures. In another embodiment, a multiple patterning technique is utilized in which the permanent structures to be defined in the target material layer are split among a plurality of layouts. In this embodiment, defining the first layout in operation 401 includes defining each of the plurality of layouts among which the permanent structures to be defined in the target material layer are split. Also in this embodiment, defining the first layout within the photoresist material layer, as recited in operation 427 of FIG. 4B, includes successively defining within the photoresist material layer each of the plurality of layouts among which the permanent structures to be defined in the target material layer are split. Therefore, it should be understood that the method for utilizing sacrificial layout features to control microloading variation in a layout, as described with regard to FIGS. 4A-4C, can be equally implemented in conjunction with a multiple patterning technique.

Figure 7A:
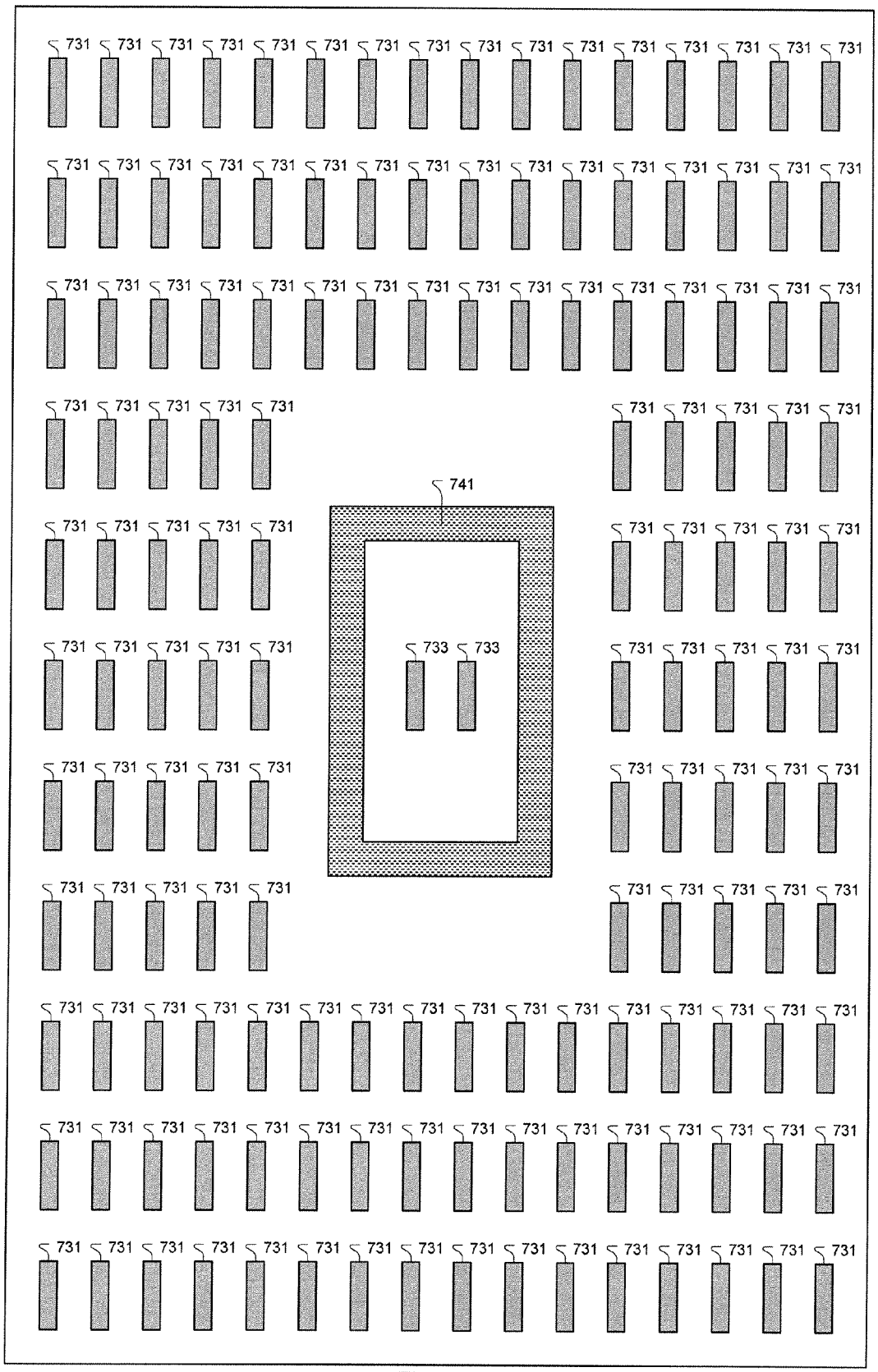
FIG. 7A shows an exemplary final layout to be defined within a target material layer, in accordance with one embodiment of the present invention.
Figure 7B:
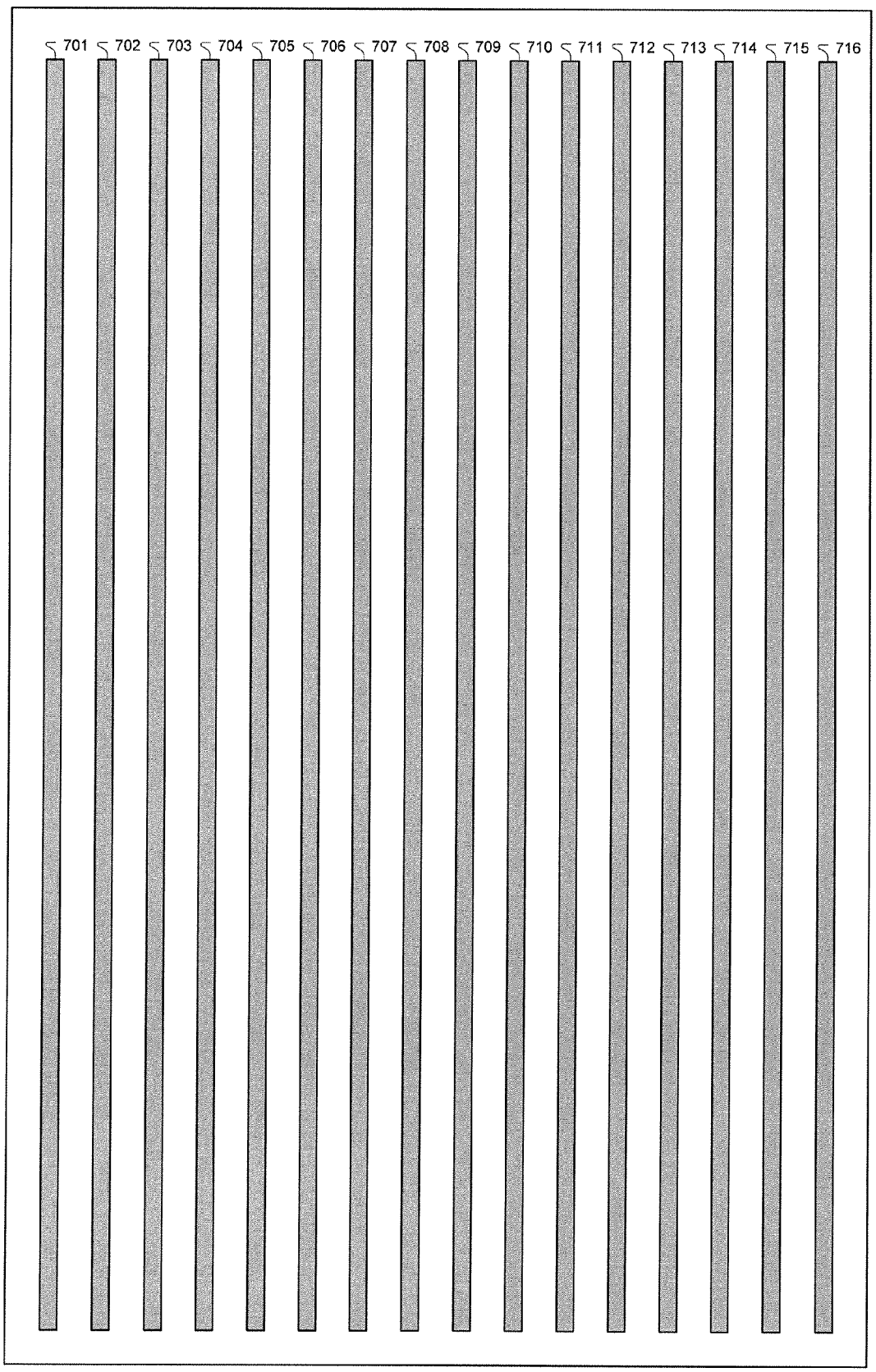
FIG. 7B shows an exemplary first layout pattern that can be used in conjunction with the method of FIG. 4A to fabricate the final layout pattern of FIG. 7A, in accordance with one embodiment of the present invention.
Figure 7C:
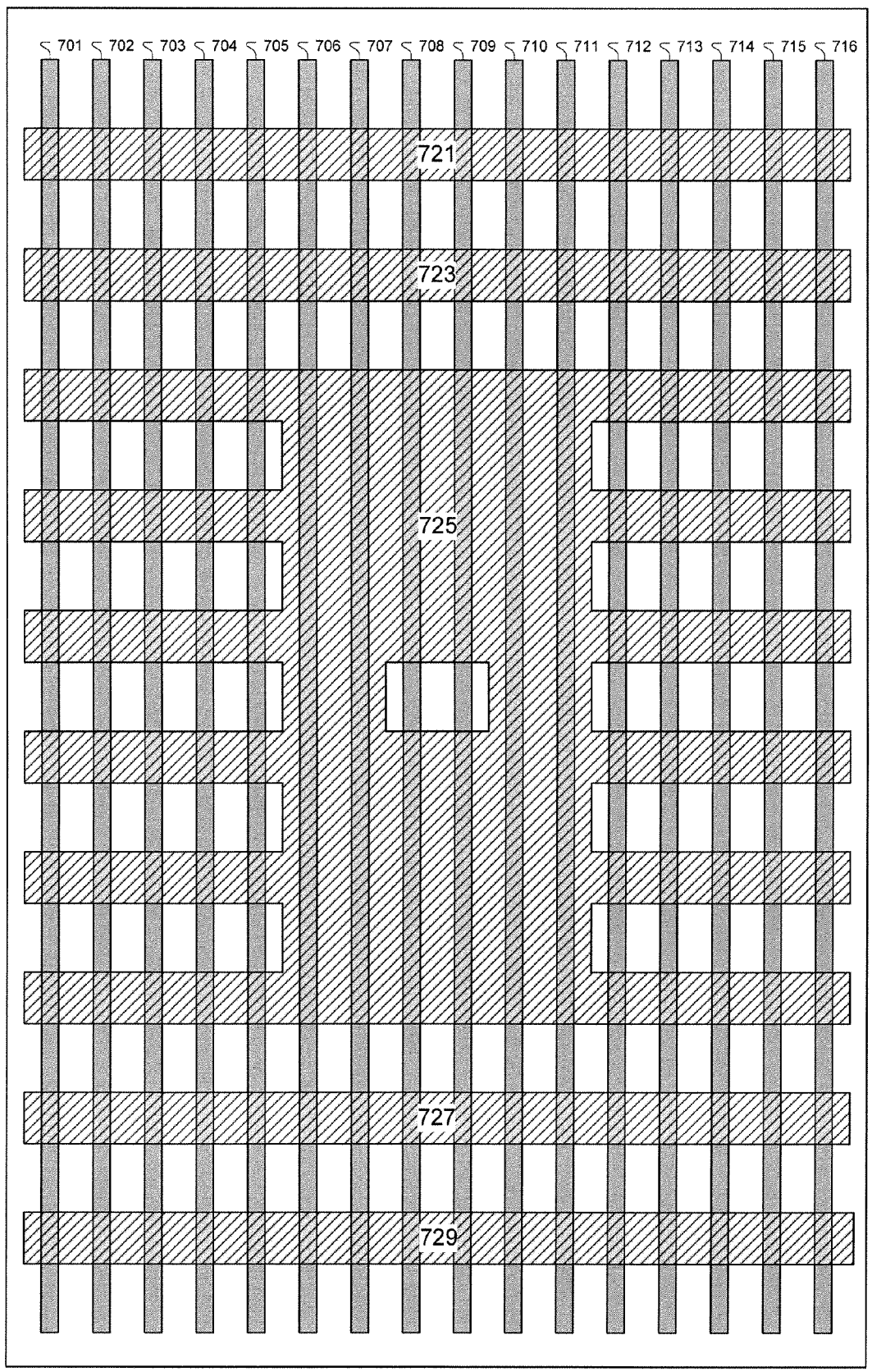
FIG. 7C shows an exemplary second layout pattern that can be used in conjunction with the method of FIG. 4A to fabricate the final layout pattern of FIG. 7A, in accordance with one embodiment of the present invention.

FIGS. 7A-7C illustrate another exemplary application of the method for utilizing sacrificial layout features to control microloading variation in a layout, as described with regard to FIGS. 4A-4C, in accordance with one embodiment of the present invention. FIG. 7A shows an exemplary final layout to be defined within a target material layer. The final layout pattern includes linear layout features 731 and 733. In one embodiment, the linear layout features 731 and 733 correspond to linear gate electrode features defined within the gate level of a chip. The linear layout features 733 are defined and placed inside of an isolation ring 741, whereas the linear layout features 731 are defined outside of the isolation ring 741. The open area of the layout between the linear layout features 731 and the linear layout features 733 may represent a substantial variation in microloading. The microloading variation in the layout of FIG. 7A can avoided by utilizing sacrificial layout features as provided in the methods of FIGS. 4A-4C.

Specifically, FIG. 7B shows an exemplary first layout pattern that can be used in conjunction with the method of FIG. 4A to fabricate the final layout pattern of FIG. 7A. The first layout pattern of FIG. 7B includes a number of linear layout features 701-716. Portions of the linear layout features 701-716 will define permanent structures corresponding to layout features 731 and 733 of the final layout pattern of FIG. 7A, and other portions of the linear layout features 701-716 will define sacrificial layout features to assist in fabrication of layout features 731 and 733 by reducing microloading variation.

FIG. 7C shows an exemplary second layout pattern that can be used in conjunction with the method of FIG. 4A to fabricate the final layout pattern of FIG. 7A. The second layout pattern of FIG. 7C includes a number of openings 721, 723, 725, 727, and 729. It should be understood that the linear layout shapes 701-716 are shown in FIG. 7C for contextual purposes and are not actually part of the second layout pattern. Specifically, the second layout pattern in the example of FIG. 7C is defined by the cross-hatched opening shapes 721, 723, 725, 727, and 729. Each of the openings 721, 723, 725, 727, and 729 in the second layout are defined to enable cutting of structures formed within the target material layer using the first layout pattern of FIG. 7B. Specifically, the openings 721, 723, 725, 727, and 729 are defined to expose sacrificial portions of the linear layout features 701-716 so that they can be removed from the target material layer through the subtractive etching process of operation 407 of the method of FIG. 4A.

Figure 8A:
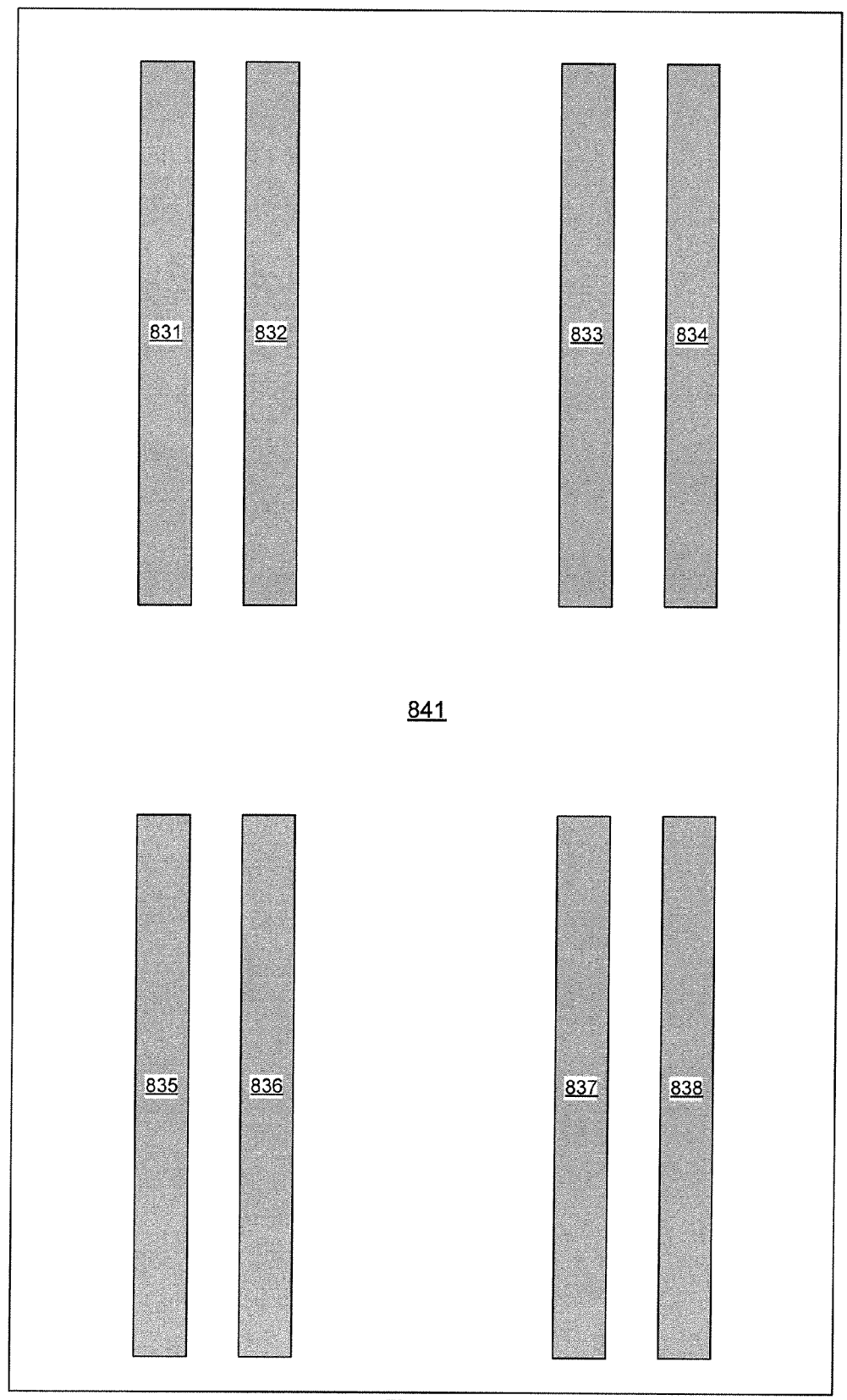
FIG. 8A shows an exemplary final layout to be defined within a target material layer, in accordance with one embodiment of the present invention.
Figure 8B:
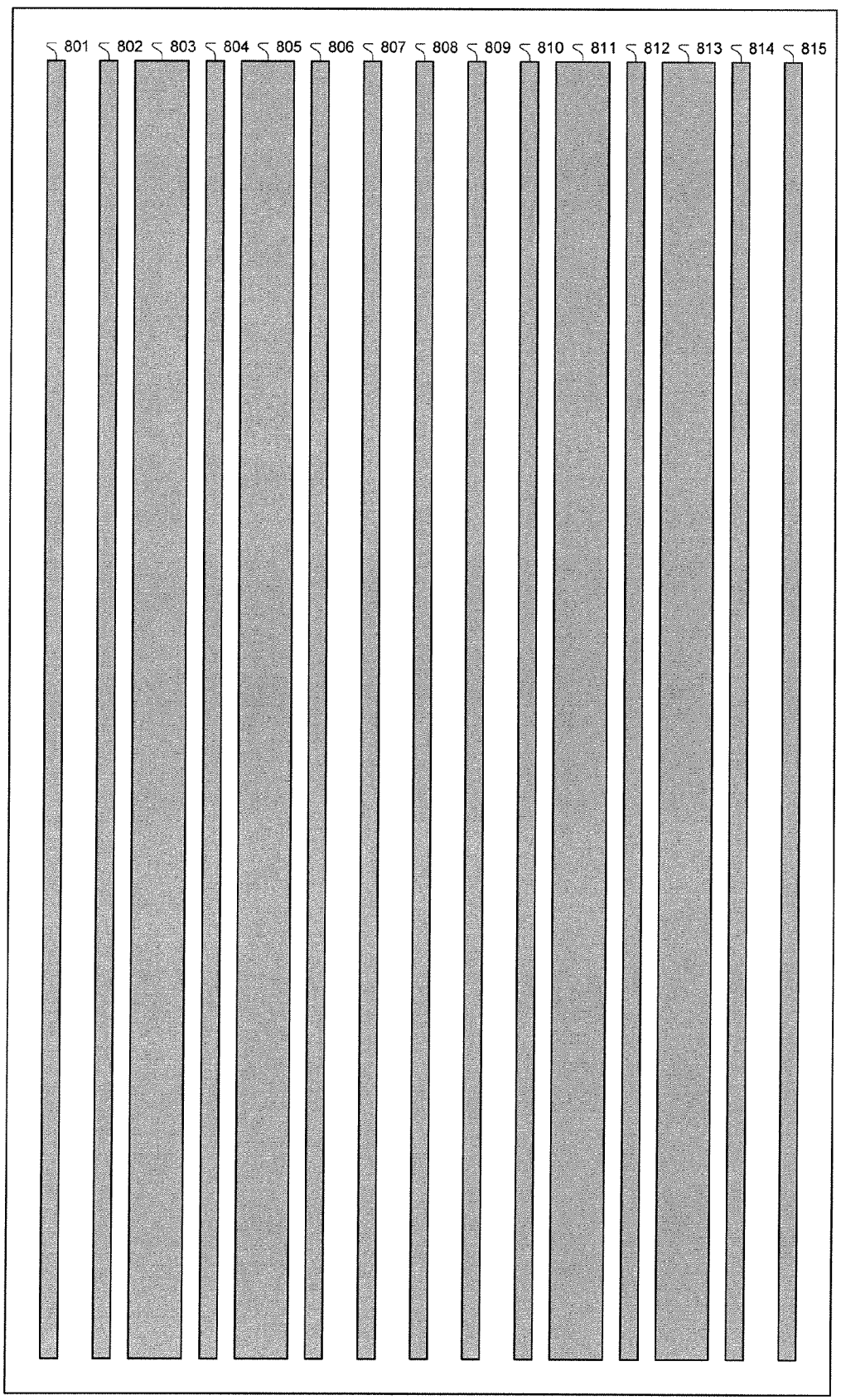
FIG. 8B shows an exemplary first layout pattern that can be used in conjunction with the method of FIG. 4A to fabricate the final layout pattern of FIG. 8A, in accordance with one embodiment of the present invention.
Figure 8C:
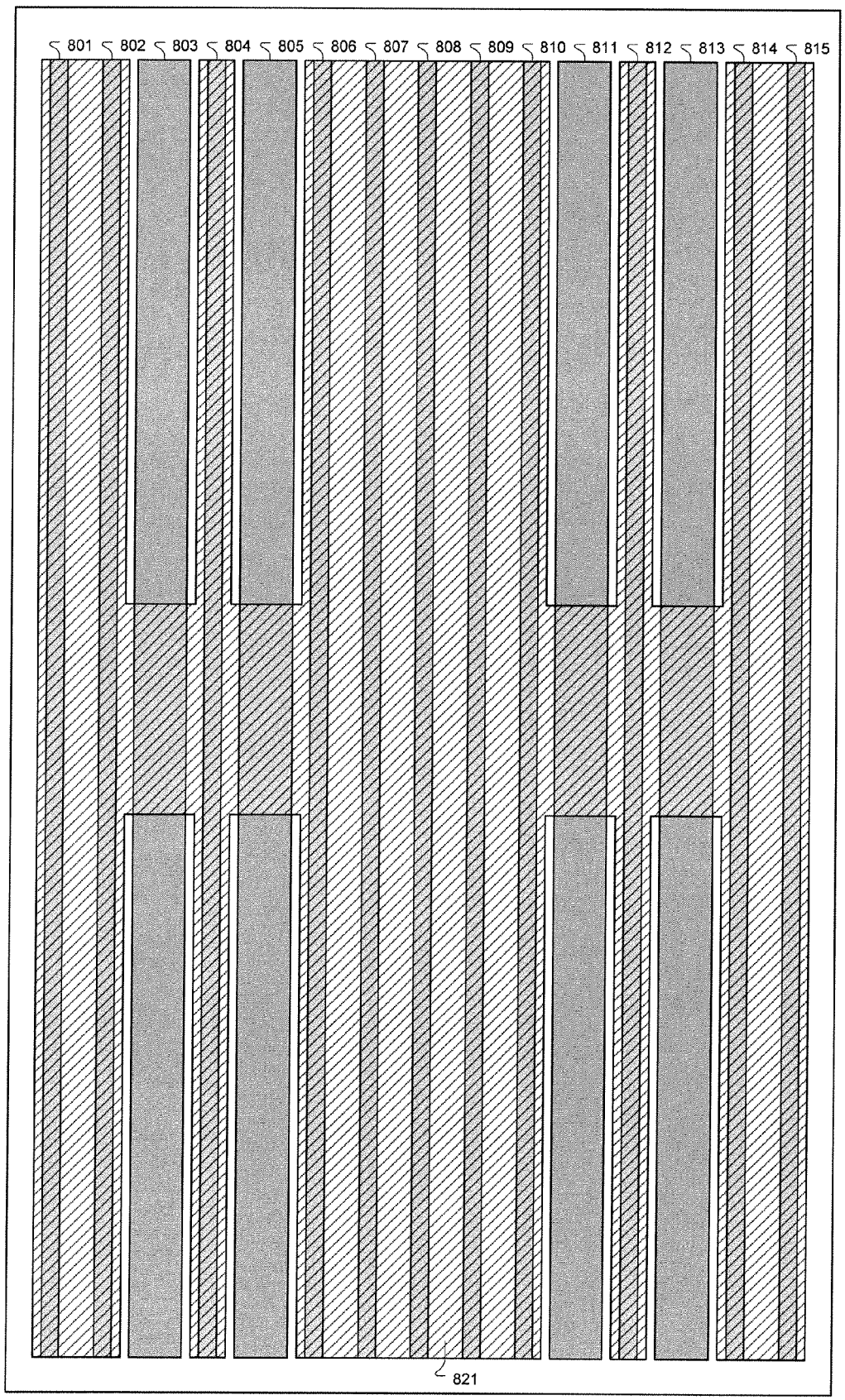
FIG. 8C shows an exemplary second layout pattern that can be used in conjunction with the method of FIG. 4A to fabricate the final layout pattern of FIG. 8A, in accordance with one embodiment of the present invention.

FIGS. 8A-8C illustrate another exemplary application of the method for utilizing sacrificial layout features to control microloading variation in a layout, as described with regard to FIGS. 4A-4C, in accordance with one embodiment of the present invention. FIG. 8A shows an exemplary final layout to be defined within a target material layer. The final layout pattern includes linear layout features 831-838. In one embodiment, the linear layout features 831-838 correspond to linear gate electrode features defined within the gate level of a chip. The open area 841 of the layout between the linear layout features 831-838 may represent a substantial variation in microloading. The microloading variation in the layout of FIG. 8A can avoided by utilizing sacrificial layout features as provided in the methods of FIGS. 4A-4C.

Specifically, FIG. 8B shows an exemplary first layout pattern that can be used in conjunction with the method of FIG. 4A to fabricate the final layout pattern of FIG. 8A. The first layout pattern of FIG. 8B includes a number of linear layout features 801-815. Portions of the linear layout features 803, 805, 811, and 813 will define permanent structures corresponding to layout features 831-838 of the final layout pattern of FIG. 8A, and the linear layout features 801-802, 804, 806-810, 812, and 814-815 define sacrificial layout features to assist in fabrication of layout features 831-838 by reducing microloading variation.

FIG. 8C shows an exemplary second layout pattern that can be used in conjunction with the method of FIG. 4A to fabricate the final layout pattern of FIG. 8A. The second layout pattern of FIG. 8C includes an opening 821. It should be understood that the linear layout shapes 801-815 are shown in FIG. 8C for contextual purposes and are not actually part of the second layout pattern. Specifically, the second layout pattern in the example of FIG. 8C is defined by the cross-hatched opening shape 821. The opening 821 in the second layout is defined to enable cutting of structures formed within the target material layer using the first layout pattern of FIG. 8B, and to remove sacrificial layout structures formed within the target material layer using the first layout pattern of FIG. 8B. Specifically, portions of structures 803, 805, 811, and 813 are exposed within the opening 821 so that they can be removed from the target material layer through the subtractive etching process of operation 407 of the method of FIG. 4A, thereby cutting structures 803, 805, 811, and 813 to form structures 831-838. Also, sacrificial structures 801-802, 804, 806-810, 812, and 814-815 are fully exposed within the opening 821 so that they can be fully removed from the target material layer through the subtractive etching process of operation 407 of the method of FIG. 4A.

It should be understood that the methods described herein can be utilized to control microloading variation in essentially any subtractive etch semiconductor fabrication process. Moreover, it should be appreciated and understood that the methods described herein can also be utilized in conjunction with essentially any type of damascene semiconductor fabrication process. Additionally, the methods disclosed herein for reducing microloading variation in a layout can be implemented to enable adjustment of an etch process to focus more on across-wafer uniformity. Specifically, wafer fabrication etch recipes and chamber hardware are designed to allow a trade-off between across-wafer uniformity versus microloading. With the methods disclosed herein for reducing microloading, the etch process can be modified to improve across-wafer uniformity. For example, using the methods disclosed herein to handle reduction of microloading it is possible to modify the etch process to reduce across-wafer non-uniformity by about one-half, e.g., from about 2% non-uniformity to about 1% non-uniformity.

It should be understood that the layouts associated with the methods disclosed herein can be stored in a tangible form, such as in a digital format on a computer readable medium. For example, the layouts defined in accordance with the methods disclosed herein can be stored in a layout data file as part of one or more cells, selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, the layouts can be included within a multi-level layout of a larger semiconductor device. The multi-level layout of the larger semiconductor device can also be stored in the form of a layout data file, such as those identified above.

Also, the methods disclosed herein can be embodied as computer readable code, i.e., program instructions, on a computer readable medium. Also, the computer readable code can include the layout data file within which layouts are stored. The computer readable code can further include program instructions for selecting one or more layout libraries and/or cells that include the layouts. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the layouts defined in accordance with the methods disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for controlling microloading variation in a semiconductor wafer layout, comprising:
    identifying, by using a computer, a first open area in a layout having a size variation relative to one or more neighboring open areas of the layout sufficient to cause adverse microloading variation, the first open area located between layout features of a first set of linear-shaped conductive structures and layout features of a second set of linear-shaped conductive structures, each layout feature of the first and second sets of linear-shaped conductive structures oriented to extend lengthwise in a first direction, end-by-end positioned layout features of the first set of linear-shaped conductive structures separated by a first distance as measured in the first direction, side-by-side positioned layout features of the first set of linear-shaped conductive structures separated by a second distance as measured in a second direction perpendicular to the first direction; and
    defining and placing dummy layout features, by using the computer, within the first open area so as to shield layout features of the first set of linear-shaped conductive structures from adverse microloading variation, wherein each dummy layout feature is defined to form a corresponding physical structure having a linear-shape extending lengthwise in the first direction, and wherein each physical structure corresponding to a given dummy layout feature is not connected within an electrical circuit, and wherein each dummy layout feature that is positioned end-by-end with a given layout feature of any of the first set of linear-shaped conductive structures is separated from the given layout feature by the first distance as measured in the first direction, and wherein each dummy layout feature that is positioned side-by-side with a given layout feature of any of the first set of linear-shaped conductive structures is separated from the given layout feature by the second distance as measured in the second direction,
    wherein the dummy layout features are defined and placed around the first open area on each of four perpendicularly related sides of the first open area to provide for shielding of the layout features of the first set of linear-shaped conductive structures neighboring the first open area, wherein multiple dummy layout features are placed along each of the four perpendicularly related sides of the first open area; and
    recording the layout in a digital format on a computer readable medium for fabrication.

2. The method of claim 1, wherein microloading variation is a variation in size and location of material areas to be etched from a semiconductor wafer.

3. The method of claim 2, wherein the adverse microloading variation is an unacceptable variation in etch rate between different locations on the semiconductor wafer.

4. The method of claim 1, wherein an open area in a layout is a space between layout shapes to be lithographically resolved during fabrication.

5. The method of claim 1, wherein the digital format is a data file format for storing and communicating one or more semiconductor device layouts.

6. The method of claim 1, wherein the computer readable medium includes program instructions for accessing and retrieving the layout in the digital format from the computer readable medium.

7. The method of claim 6, wherein the program instructions for accessing and retrieving include program instructions for selecting a library, a cell, or both library and cell including the layout in the digital format.

8. The method of claim 1, wherein end-by-end positioned layout features of the second set of linear-shaped conductive structures are separated by a third distance as measured in the first direction.

9. The method of claim 8, wherein side-by-side positioned layout features of the second set of linear-shaped conductive structures separated by a fourth distance as measured in the second direction perpendicular to the first direction.

10. The method of claim 9, wherein each dummy layout feature that is positioned end-by-end with a given layout feature of any of the second set of linear-shaped conductive structures is separated from the given layout feature by the third distance as measured in the first direction.

11. The method of claim 10, wherein each dummy layout feature that is positioned side-by-side with a given layout feature of any of the second set of linear-shaped conductive structures is separated from the given layout feature by the fourth distance as measured in the second direction.

12. The method of claim 11, wherein the layout features of the first set of linear-shaped conductive structures are positioned inside of an isolation guard ring, and the layout features of the second set of linear-shaped conductive structures are positioned outside of the isolation guard ring.

13. The method of claim 1, wherein the layout features of the first set of linear-shaped conductive structures are positioned inside of an isolation guard ring, and the layout features of the second set of linear-shaped conductive structures are positioned outside of the isolation guard ring.

14. A semiconductor device, comprising:
- a first set of linear-shaped conductive structures, each of the first set of linear-shaped conductive structures oriented to extend lengthwise in a first direction, wherein end-by-end positioned ones of the first set of linear-shaped conductive structures are separated by a first distance as measured in the first direction, wherein side-by-side positioned ones of the first set of linear-shaped conductive structures are separated by a second distance as measured in a second direction perpendicular to the first direction;
- a second set of linear-shaped conductive structures, each of the second set of linear-shaped conductive structures oriented to extend lengthwise in the first direction, the second set of linear-shaped conductive structures separated from the first set of linear-shaped conductive structures by a first area that does not include functional conductive structures;
- dummy structures positioned within the first area, wherein each dummy structure has a linear-shape extending lengthwise in the first direction, wherein each dummy structure is not connected within an electrical circuit, wherein each dummy structure that is positioned end-by-end with any given structure of the first set of linear-shaped conductive structures is separated from the given structure by the first distance as measured in the first direction, and wherein each dummy structure that is positioned side-by-side with any given structure of the first set of linear-shaped conductive structures is separated from the given structure by the second distance as measured in the second direction;
- wherein the dummy structure are positioned around the first area on each of four perpendicularly related sides of the first area; and
- wherein multiple dummy structures are positioned along each of the four perpendicularly related sides of the first area.

15. The semiconductor device of claim 14, wherein end-by-end positioned ones of the second set of linear-shaped conductive structures are separated by a third distance as measured in the first direction.

16. The semiconductor device of claim 15, wherein side-by-side positioned ones of the second set of linear-shaped conductive structures are separated by a fourth distance as measured in the second direction perpendicular to the first direction.

17. The semiconductor device of claim 16, wherein each dummy structure that is positioned end-by-end with any given structure of the second set of linear-shaped conductive structures is separated from the given structure by the third distance as measured in the first direction.

18. The semiconductor device of claim 17, wherein each dummy structure that is positioned side-by-side with any given structure of the second set of linear-shaped conductive structures is separated from the given structure by the fourth distance as measured in the second direction.

19. The semiconductor device of claim 18, wherein the first set of linear-shaped conductive structures are positioned inside of an isolation guard ring, and the second set of linear-shaped conductive structures are positioned outside of the isolation guard ring.

20. The semiconductor device of claim 14, wherein the first set of linear-shaped conductive structures are positioned inside of an isolation guard ring, and the second set of linear-shaped conductive structures are positioned outside of the isolation guard ring.

* * * * *